United States Patent
Nishima et al.

(10) Patent No.: US 9,549,159 B2
(45) Date of Patent: Jan. 17, 2017

(54) IMAGE PROJECTION APPARATUS AND IMAGE PROJECTION METHOD FOR PROJECTING CUT-OUT IMAGE IN A PREDETERMINED CYCLE

(71) Applicant: JVC KENWOOD Corporation, Yokohama-shi (JP)

(72) Inventors: Ryo Nishima, Yokohama (JP); Katsumi Watanuki, Yokohama (JP); Hisato Seki, Yokosuka (JP); Kenji Yasui, Yokosuka (JP); Norihisa Yamamoto, Tama (JP); Shunichi Shichijo, Yokosuka (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 284 days.

(21) Appl. No.: 14/542,310

(22) Filed: Nov. 14, 2014

(65) Prior Publication Data

US 2015/0070662 A1 Mar. 12, 2015

Related U.S. Application Data

(63) Continuation of application No. PCT/JP2013/063337, filed on May 13, 2013.

(30) Foreign Application Priority Data

May 16, 2012 (JP) .................. 2012-112909
May 16, 2012 (JP) .................. 2012-112913

(51) Int. Cl.
*H04N 9/31* (2006.01)
*G03B 21/14* (2006.01)

(52) U.S. Cl.
CPC .......... *H04N 9/3185* (2013.01); *G03B 21/142* (2013.01); *G03B 21/145* (2013.01);
(Continued)

(58) Field of Classification Search
CPC ... G03B 21/147; G03B 21/142; H04N 9/3185; H04N 9/3188; H04N 9/3194; H04N 9/3147
See application file for complete search history.

(56) References Cited

U.S. PATENT DOCUMENTS 6,431,711 B1 * 8/2002 Pinhanez .............. G03B 21/28
  348/E5.137
7,090,358 B2 * 8/2006 Feigel ..................... G06F 3/011
  348/77

(Continued)

FOREIGN PATENT DOCUMENTS

JP 2004-077545 A 3/2004
JP 2005-043570 A 2/2005
(Continued)

OTHER PUBLICATIONS

Office Action in counterpart Taiwanese Patent Application No. 10520905180, dated Jul. 22, 2016.
(Continued)

*Primary Examiner* — Bao-Luan Le
(74) *Attorney, Agent, or Firm* — Venable LLP; Michael A. Sartori

(57) ABSTRACT

An image projection apparatus includes a light modulation device that modulates light according to image data; a projecting unit that projects modulated light; an angle-of-view deriving unit that derives an angle of view at which modulated light is projected; a projection-direction changing unit that changes a projection direction from a first direction to a second direction; a projection-angle deriving unit that derives a projection angle between the first direction and a changed projection direction; a storage unit that stores image data; and an image cutting unit that generates cut-out image data by cutting a part of the image data based on the angle of view and the projection angle as image data projected (Continued)

from the first direction through the second direction, and the minimum variable angle is determined based on the angle of view and a size of an effective region of the modulated light.

5 Claims, 26 Drawing Sheets

(52) U.S. Cl.
CPC ......... *G03B 21/147* (2013.01); *H04N 9/3147* (2013.01); *H04N 9/3188* (2013.01); *H04N 9/3194* (2013.01)

(56) References Cited

U.S. PATENT DOCUMENTS

| | | | | |
|---|---|---|---|---|
| 7,134,080 B2* | 11/2006 | Kjeldsen | ................ | H04N 5/74 348/E5.137 |
| 7,289,114 B2* | 10/2007 | Damera-Venkata | ... | G09G 3/007 345/100 |
| 7,358,930 B2* | 4/2008 | Childers | .............. | H04N 9/3188 345/32 |
| 7,530,019 B2* | 5/2009 | Kjeldsen | ................ | H04N 5/74 715/730 |
| 7,576,727 B2* | 8/2009 | Bell | ................ | G06F 3/011 345/156 |
| 8,155,872 B2* | 4/2012 | Kjeldsen | ............. | G03B 21/006 340/8.1 |
| 8,199,108 B2* | 6/2012 | Bell | ................ | G06F 3/011 345/156 |
| 8,446,288 B2* | 5/2013 | Mizushima | .......... | H04N 9/3129 340/539.1 |
| 8,454,173 B2* | 6/2013 | Nakamura | ............. | G03B 21/14 345/1.3 |
| 8,589,796 B2* | 11/2013 | Moesgaard Kjeldsen | ................ | G03B 21/28 715/730 |
| 8,591,039 B2* | 11/2013 | Morrison | ............. | G06F 3/0412 348/745 |
| 8,840,250 B1* | 9/2014 | Yao | ................ | G01S 17/46 345/633 |
| 8,845,110 B1* | 9/2014 | Worley, III | ............ | G03B 17/54 348/135 |
| 8,887,043 B1* | 11/2014 | Pollack | ................ | G06F 3/017 345/108 |
| 8,905,551 B1* | 12/2014 | Worley, III | ............ | G06F 3/011 353/122 |
| 9,028,076 B2* | 5/2015 | Nishima | ................ | G03B 21/16 353/119 |
| 9,129,375 B1* | 9/2015 | Liu | ................ | G06T 7/0038 |
| 9,241,141 B1* | 1/2016 | Chang | ................ | H04N 7/183 |
| 9,268,520 B1* | 2/2016 | Cederlof | ................ | G06F 3/16 |
| 9,336,602 B1* | 5/2016 | Chang | ................ | G06T 7/0075 |
| 2002/0105623 A1* | 8/2002 | Pinhanez | ................ | G03B 21/28 353/69 |
| 2004/0036717 A1* | 2/2004 | Kjeldsen | ................ | H04N 5/74 715/730 |
| 2005/0025388 A1* | 2/2005 | Damera-Venkata | ... | G09G 3/007 382/300 |
| 2005/0078056 A1* | 4/2005 | Childers | ............. | H04N 9/3188 345/32 |
| 2005/0128437 A1* | 6/2005 | Pingali | ................ | H04N 9/3194 353/69 |
| 2005/0195373 A1* | 9/2005 | Feigel | ................ | G06F 3/011 353/94 |
| 2007/0013716 A1* | 1/2007 | Kjeldsen | ................ | H04N 5/74 345/594 |
| 2008/0180637 A1* | 7/2008 | Kjeldsen | ............. | G03B 21/006 353/11 |
| 2008/0218641 A1* | 9/2008 | Kjeldsen | ................ | H04N 5/74 348/746 |
| 2010/0289664 A1* | 11/2010 | Mizushima | .......... | H04N 9/3129 340/691.6 |
| 2011/0157486 A1* | 6/2011 | Murata | ................ | G08B 7/062 348/744 |
| 2012/0069308 A1 | 3/2012 | Satake et al. | | |
| 2013/0010268 A1* | 1/2013 | Nishima | ................ | G03B 21/16 353/52 |

FOREIGN PATENT DOCUMENTS

| | | |
|---|---|---|
| JP | 2005-338249 A | 12/2005 |
| JP | 2007-333870 A | 12/2007 |
| TW | 200536384 A | 11/2005 |
| TW | M425322 U1 | 3/2012 |
| WO | WO-2010/137626 A1 | 12/2010 |

OTHER PUBLICATIONS

International Search Report and Written Opinion in PCT International Application No. PCT/JP2013/063337, dated Jun. 18, 2013.

\* cited by examiner

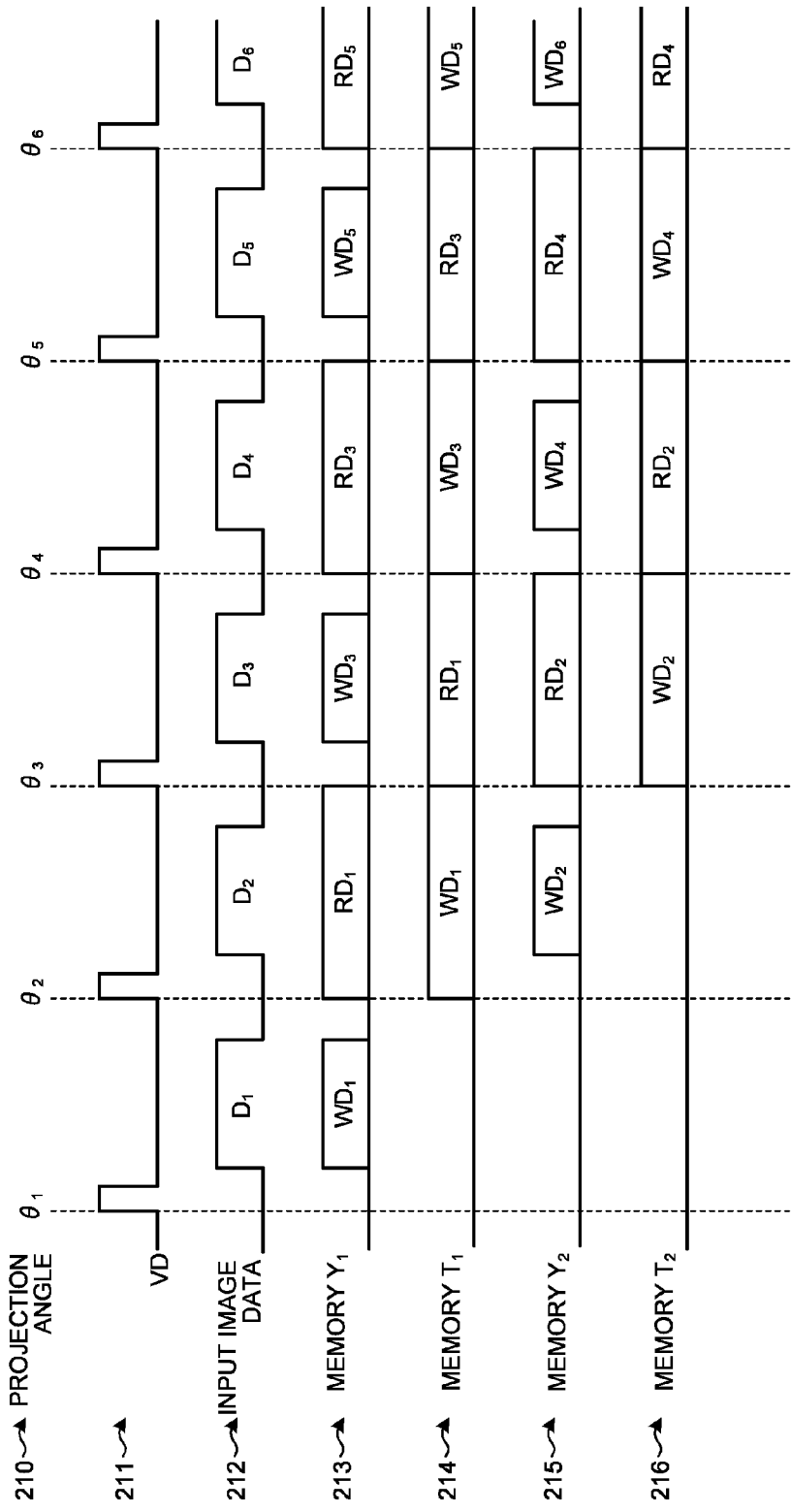

IMAGE PROJECTION APPARATUS AND IMAGE PROJECTION METHOD FOR PROJECTING CUT-OUT IMAGE IN A PREDETERMINED CYCLE

CROSS-REFERENCE TO RELATED APPLICATION(S)

This application is a continuation of International Application No. PCT/JP2013/063337, filed on May 13, 2013 which claims the benefit of priority of the prior Japanese Patent Application No. 2012-112909, filed on May 16, 2012 and Japanese Patent Application No. 2012-112913, filed on May 16, 2012, the entire contents of which are incorporated herein by reference.

BACKGROUND OF THE INVENTION

1. Field of the Invention

The present invention relates to an image projection apparatus and an image projection method for projecting an image on a projection medium.

2. Description of the Related Art

A projection apparatus that projects, by driving a display device based on an input image signal, an image according to the image signal on a screen, a wall, or the like has been known. In such a projection apparatus, there is a limit in an amount of information that can be projected due to a limit originated in a mechanism that defines a direction of projection of a projecting unit equipped in the projection apparatus, or a limit in resolution of a display device.

Therefore, a projection apparatus has been developed that performs projection of an image by reducing an information amount of an image to be projected when the resolution of an image according to an input image signal is higher than the resolution of a display device equipped in the projection apparatus.

As a first example thereof, there is a projection apparatus that reduces the resolution of an image according to an input image signal to reduce the size (area) of an image to be projected to a projectable size (area) based on the resolution of a display device, and then performs projection of the reduced image. Moreover, as a second example thereof, there is a projection apparatus that cuts out a part of region from an image according to an input image signal, and projects only an image according to the cut out region. Among projection apparatuses of the latter example, there also is one that can project a whole image according to an input image signal by, so called, scroll that sequentially changes a region to be cut out and projected, or the like.

However, in the projection apparatus of the first example described above, while a whole image according to an input image signal can be projected, there is a problem that the quality of an image displayed on a projection medium is deteriorated due to size-reduction processing of an image based on reduction of the resolution. From another point of view, it can be said that the high resolution of an input image signal is wasted by the size reduction processing of an image.

Furthermore, although the projection apparatus of the second example described above can maintain the resolution of the image signal also in an image displayed on a projection medium, there is a problem that the projection apparatus of the second example cannot project a whole image according to the input image signal at a time.

On the other hand, in Japanese Laid-open Patent Publication No. 2005-43570, a projector is disclosed that detects an orientation and a position of a main unit, extracts an actual display image to be actually displayed from an original display image based on a result of the detection, and projects the actual display image, while changing a region to be extracted as the actual display image side to side and up and down inside the original display image by moving the projector upward and downward, and rightward and leftward by a user. According to the projector of Japanese Laid-open Patent Publication No. 2005-43570, a user can appropriately project only an image of a region wished to be projected as necessary by adjusting an orientation of the main unit relative to a projection medium, or a distance to the projection medium.

However, in Japanese Laid-open Patent Publication No. 2005-43570, because the orientation of the projector is detected by, for example, imaging a display image to be projected by a charge coupled device (CCD) as an imaging device, there has been a problem that the accuracy in the orientation detection can be dependent on the contents of the display image. For example, when a dark image such as a night scene is projected in a dark room, the detection of an orientation might be disabled. Moreover, because the orientation detection is performed by analyzing an image picked up by a CCD, there has been a problem that a delay occurs in reflection of a result of the orientation detection to the display image.

SUMMARY OF THE INVENTION

It is an object of the present invention to at least partially solve the problems in the conventional technology.

There is provided an image projection apparatus that includes a light modulation device that modulates light according to image data in a pixel unit; a projecting unit that projects light modulated by the light modulation device; an angle-of-view deriving unit that derives an angle of view at which light modulated by the light modulation device is projected by the projecting unit; a projection-direction changing unit that changes a projection direction of the projecting unit from a first projection direction to a second projection direction, based on a minimum variable angle; a projection-angle deriving unit that derives a projection angle between the first projection direction and a projection direction changed by the projection-direction changing unit; a storage unit that stores input image data input; and an image cutting unit that generates cut-out image data that is obtained by cutting a region of a part of an image of the input image data that is stored in the storage unit based on the angle of view and the projection angle in a predetermined cycle as image data projected by the projecting unit when the projecting unit projects from the first projection direction through the second projection direction, and the minimum variable angle is determined based on the angle of view and a size in a pixel unit of an effective region in which the light modulation device modulates light.

The present invention also provides an image projection method that includes deriving an angle of view at which a projecting unit that projects light modulated by a light modulation device modulating light according to image data in a pixel unit projects light modulated by the light modulation device; changing a projection direction of the projecting unit from a first projection direction to a second projection direction based on a minimum variable angle; deriving a projection angle between the first projection direction and a projection direction changed at the changing; storing input image data input; generating cut-out image data that is obtained by cutting a region of a part of an image of the input image data that is stored at the storing based on the angle of view and the projection angle in a predetermined cycle as the image data projected by the projecting unit when the projecting unit projects from the first projection direction through the second projection direction and the minimum variable angle is determined based on the angle of view and a size in a pixel unit of an effective region in which the light modulation device modulates light. The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 13 is a time chart for explaining the access control of the memory of the first embodiment;

DETAILED DESCRIPTION OF THE PREFERRED EMBODIMENTS

Exemplary embodiments of an image projection apparatus and an image projection method are explained below with reference to the drawings. Specific values, an external configuration, and the like indicated in the embodiments are only examples to facilitate understanding of the present invention, and it is not limited thereby unless otherwise specified. Explanation and illustration of elements that are not directly related to the present invention are omitted.

First Embodiment

External View of Image Projection Apparatus

Figure 1A:
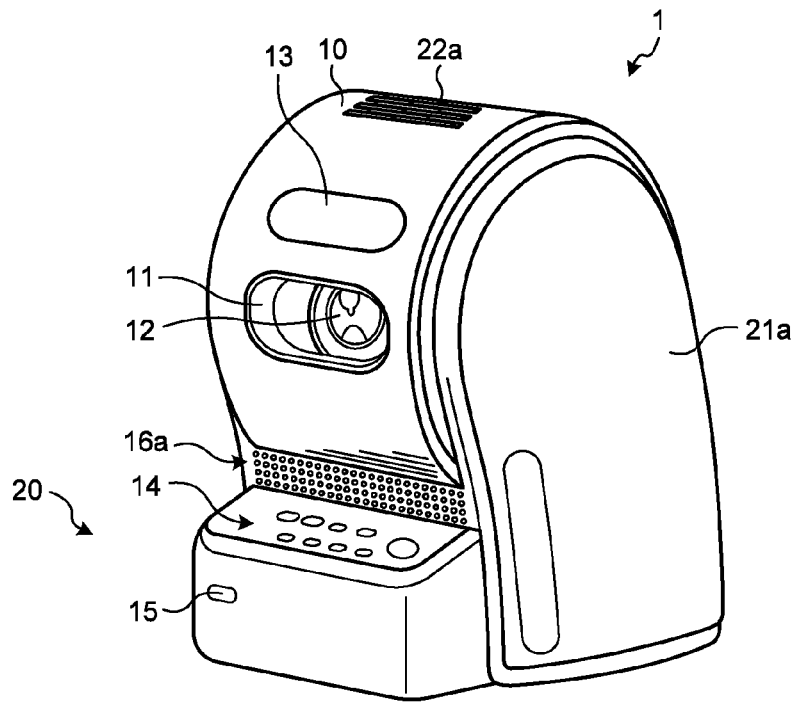
FIG. 1A is a diagram illustrating an external view of one example of a projector apparatus that is applicable to a first embodiment.
Figure 1B:
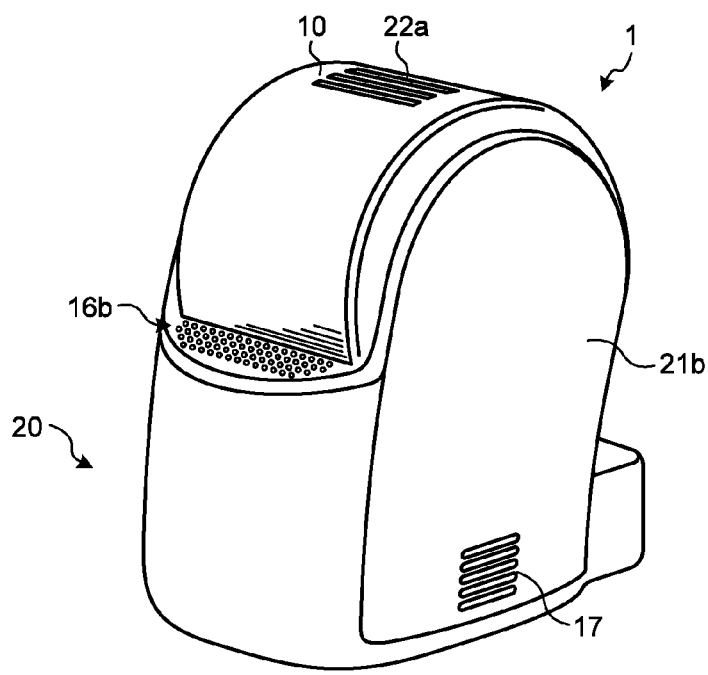
FIG. 1B is a diagram illustrating an external view of one example of a projector apparatus that is applicable to the first embodiment.

FIG. 1A and FIG. 1B are diagrams illustrating an external view of one example of an image projection apparatus (projector apparatus) 1 according to a first embodiment. FIG. 1A is a perspective view of a projector apparatus 1 from a first surface side on which an operating unit is arranged, and FIG. 1B is a perspective view of the projector apparatus 1 from a second surface side opposed to the operating unit. The projector apparatus 1 includes a drum unit 10 and a base 20. The drum unit 10 is a rotating body that can be rotated relative to the base 20. The base 20 includes a supporting unit that supports the drum unit 10 in a rotatable manner, and a circuit unit that performs various kinds of control such as rotation drive control of the drum unit 10 and image processing control.

The drum unit 10 is rotatably supported by a not illustrated rotation axis that is constituted of bearing and the like that are arranged inside side plates 21a and 21b that are a part of the base 20. Inside the drum unit 10, a light source, a display device that modulates light emitted from the light source according to image data, a drive circuit that drives the display device, an optical engine unit including an optical system that projects the light modulated by the display device to the exterior, and a cooling unit to cool the light source and the like by a fan or the like are arranged.

The drum unit 10 has a windows 11 and 13. The window 11 is arranged such that light projected from a projection lens 12 of the optical system described above is emitted to the exterior. To the window 13, a distance sensor that derives a distance to a projection medium by using, for example, infrared rays, ultrasound, or the like is arranged. Moreover, the drum unit 10 has an intake/exhaust vent 22a to intake and exhaust air for heat rejection by a fan.

Inside the base 20, various kinds of circuit boards of the circuit unit and a power source unit, a driving unit to drive the drum unit 10 to be rotated, and the like are arranged. The driving to rotate the drum unit 10 by this driving unit is described later. On the first surface side described above of the base 20, an operating unit 14 for a user to input various kinds of operations to control the projector apparatus 1, and a receiving unit 15 that receives a signal transmitted from a remote control commander when this projector apparatus 1 is remotely controlled by a user using the remote control commander not illustrated are arranged. The operating unit 14 has various kinds of operation parts that accept operation input by a user, a display unit to display a state of this projector apparatus 1, and the like.

On the first surface side and the second surface side described above of the base 20, intake/exhaust vents 16a and 16b are arranged, respectively, enabling air intake and exhaust such that the heat rejection efficiency in the drum unit 10 is not deteriorated even when the drum unit 10 is driven to be rotated and has such an orientation that the intake/exhaust vent 22a of the drum unit 10 faces the base 20 side. Furthermore, an intake/exhaust vent 17 that is arranged on a side surface of a casing is to intake and exhaust air to reject heat of the circuit unit.

Rotation Drive of Drum Unit

Figure 2A:
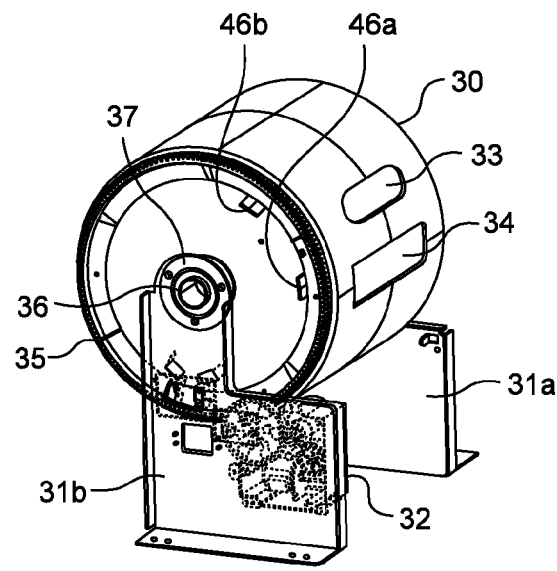
FIG. 2A is a diagram illustrating one example of a configuration to drive a drum unit according to the first embodiment to be rotated.
Figure 2B:
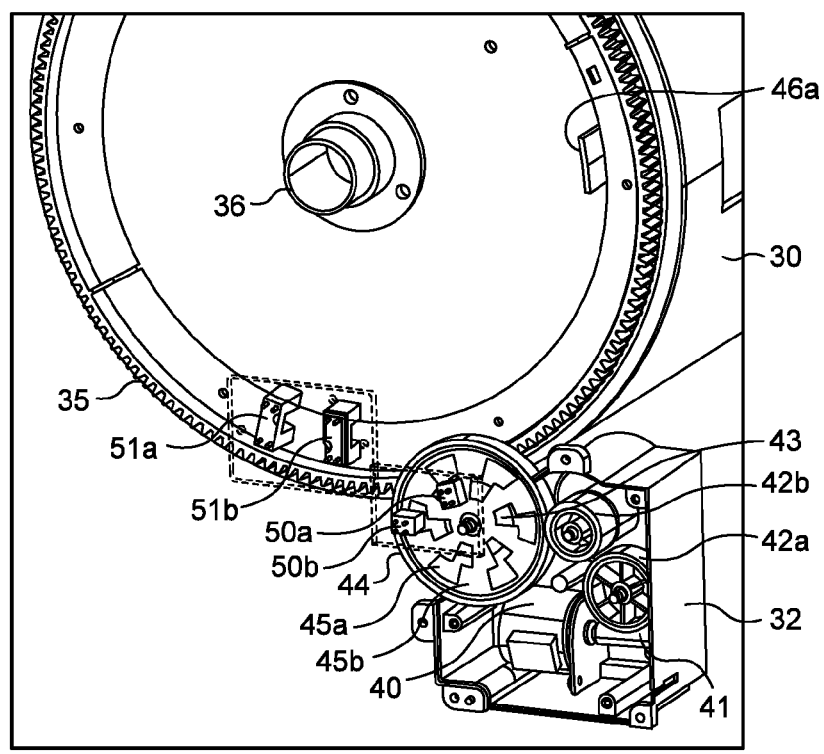
FIG. 2B is a diagram illustrating one example of a configuration to drive the drum unit according to the first embodiment to be rotated.

FIG. 2A and FIG. 2B are diagrams for explaining about rotation drive of the drum unit 10 by a driving unit 32 arranged in the base 20. FIG. 2A is a diagram illustrating a configuration of a drum 30 that is a state in which a cover and the like of the drum unit 10 are removed, and the driving unit 32 that is arranged in the base 20. In the drum 30, a window 34 that corresponds to the window 11 described above and a window 33 that corresponds to the window 13 described above are arranged. The drum 30 has a rotation axis 36, and is rotatably attached, by this rotation axis 36, to a bearing 37 arranged at supporting units 31a and 31b.

On one side of the drum 30, a gear 35 is arranged on a circumference thereof. The drum 30 is driven to be rotated by the driving unit 32 that is arranged in the supporting unit 31b through the gear 35. Protrusions 46a and 46b at an inner circumference of the gear 35 are arranged to detect a start point and an end point of the rotation of the drum 30.

FIG. 2B is an enlarged view to show the configuration of the driving unit 32 that is arranged in the drum 30 and the base 20 in further details. The driving unit 32 has a motor 40, and has a gear group including a worm gear 41 that is directly driven by a rotation axis of the motor 40, gears 42a and 42b that transmits rotation by the worm gear 41, and a gear 43 that transmits rotation transmitted from the gear 42b to the gear 35 of the drum 30. By transmitting rotation of the motor 40 to the gear 35 by this gear group, the drum 30 can be rotated according to rotation of the motor 40. As the motor 40, for example, a stepping motor that performs rotation control of each predetermined angle by a driving pulse of a predetermined pulse width can be applied.

To the supporting unit 31b, photointerrupters 51a and 51b are arranged. The photointerrupters 51a and 51b detect the protrusions 46b and 46a arranged at the inner circumference of the gear 35, respectively. Output signals of the photointerrupters 51a and 51b are provided to a rotation control unit 104 described later. In the first embodiment, the rotation control unit 104 determines that the orientation of the drum 30 is such an orientation that the rotation has reached the end point when the protrusion 46b is detected by the photointerrupter 51a. Moreover, the rotation control unit 104 determines that the orientation of the drum 30 is such an orientation that the rotation has reached the start point when the protrusion 46a is detected by the photointerrupter 51b.

In the following, a direction in which the drum 30 rotates through an arc having longer length on the circumference of the drum from a position at which the protrusion 46a is detected by the photointerrupter 51b to a position at which the protrusion 46b is detected by the photointerrupter 51a is considered as a forward direction. That is, a rotation angle of the drum 30 increases toward the forward direction.

In the first embodiment, the photointerrupters 51a and 51b and the protrusions 46a and 46b are arranged in such a manner that an angle formed with the rotation axis 36 between a detection position at which the photointerrupter 51*b* detects the protrusion 46*a* and a detection position at which the photointerrupter 51*a* detects the protrusion 46*b* is 270°.

For example, when a stepping motor is applied as the motor 40, based on detection timing of the protrusion 46*a* by the photointerrupter 51*b* and the number of driving pulses to drive the motor 40, the orientation of the drum 30 is identified and a projection angle by the projection lens 12 can be acquired.

The motor 40 is not limited to a stepping motor, and for example, a direct current (DC) motor is also applicable. In this case, for example, as indicated in FIG. 2B, a code wheel 44 that rotates along the gear 43 on the same axis relative to the gear 43 is arranged, and photoreflectors 50*a* and 50*b* are arranged to the supporting unit 31*b*, to constitute a rotary encoder.

In the code wheel 44, for example, a transmission unit 45*a* and a reflection unit 45*b* that are arranged to have different phases in a direction of radius are arranged. A rotation speed and a rotation direction of the gear 43 can be detected by receiving reflection lights of respective phases from the code wheel 44 by the photoreflectors 50*a* and 50*b*. Based on these detected rotation speed and rotation direction of the gear 43, a rotation speed and a rotation direction of the drum 30 are derived. Based on these derived rotation speed and rotation direction of the drum 30, and based on a result of detection of the protrusion 46*b* by the photointerrupter 51*a*, the orientation of the drum 30 is identified, and the projection angle of the projection lens 12 can be acquired.

Figure 3:
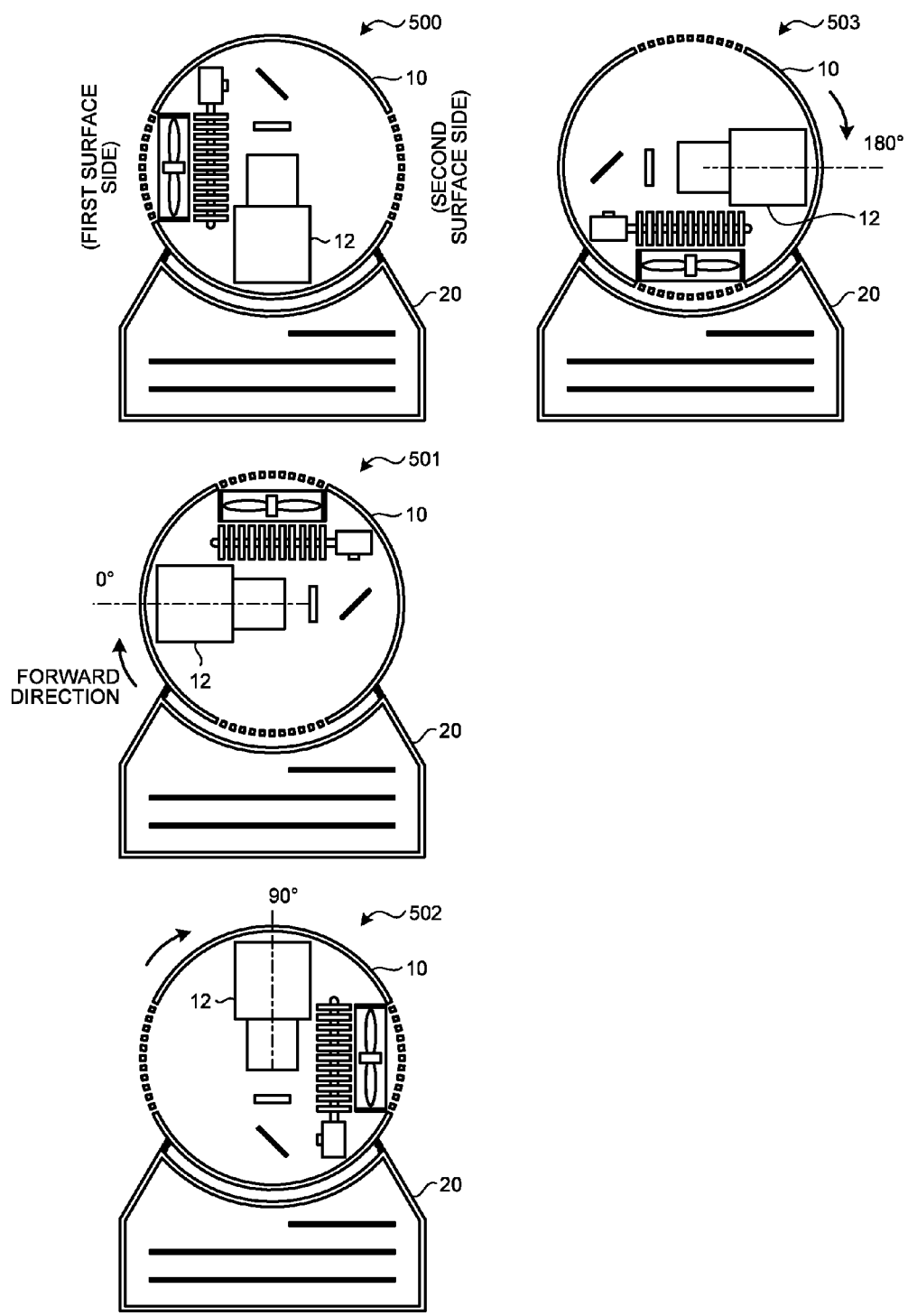
FIG. 3 is a diagram for explaining each orientation of the drum unit according to the first embodiment.

By the configuration described above, the initial orientation of the drum unit 10 is considered as the orientation in which the projection direction of the projection lens 12 faces the perpendicular direction. Therefore, in the initial state, the projection lens 12 is completely hidden by the base 20. FIG. 3 is a diagram for explaining each orientation of the drum unit 10. In FIG. 3, a state 500 shows a state of the drum unit 10 in the initial orientation. In the first embodiment, in this initial orientation, the protrusion 46*a* is detected by the photointerrupter 51*b*, and the rotation control unit 104 described later determines that the drum 30 has reached the start point of rotation.

In the following, unless otherwise particularly described, the "direction of the drum unit 10" and the "angle of the drum unit 10" used synonymously with the "projection direction of the projection lens 12" and the "projection angle of the projection lens 12".

When the projector apparatus 1 is activated, the driving unit 32 starts rotation of the drum unit 10 so that the projection direction of the projection lens 12 faces the first surface side described above. Suppose the drum unit 10 thereafter rotates, for example, to a position at which the direction of the drum unit 10, that is, the projection direction of the projection lens 12 becomes horizontal on the first surface side, and then stops rotating once. The projection angle of the projection lens 12 when this projection direction of the projection lens 12 is horizontal on the first surface side is defined as the projection angle 0°. In FIG. 3, a state 501 shows a state of the orientation of the drum unit 10 (projection lens 12) when the projection angle is 0°. Hereinafter, the orientation of the drum unit 10 (projection lens 12) with the projection angle $\theta$ is referred to as a $\theta$ orientation relative to the orientation with the projection angle 0°.

For example, suppose image data is input at a 0°-orientation, and the light source is turned on. In the drum unit 10, light emitted from the light source is modulated according to the image data by the display device that is driven by the driving circuit to enter the optical system. The light modulated according to the image data is then projected in a horizontal direction from the projection lens 12 to be irradiated on a projection medium such as a screen and a wall.

A user can rotate the drum unit 10 about the rotation axis 36, while keeping projection performed according to the image data from the projection lens 12, by operating the operating unit 14 and the like. For example, the drum unit 10 can be rotated in the forward direction from the 0°-orientation so that the rotation angle is 90° (90°-orientation), and light from the projection lens 12 can be projected perpendicularly upward relative to a bottom surface of the base 20. In FIG. 3, a state 502 indicates a state of the drum unit 10 in the orientation when the projection angle $\theta$ is 90°, that is, in the 90°-orientation.

The drum unit 10 can be further rotated in the forward direction from the 90°-orientation. In this case, the projection direction of the projection lens 12 changes from the perpendicularly upward direction relative to the bottom surface of the base 20 to a direction of the second surface side described above. In FIG. 3, a state 503 indicates a state in which the drum unit 10 is further rotated in the forward direction from the 90°-orientation of the state 502, and the projection angle $\theta$ is 180°, that is, in a 180°-orientation. In the projector apparatus 1 according to the first embodiment, the protrusion 46*b* is detected by the photointerrupter 51*a* in this 180°-orientation, and the rotation control unit 104 described later determines that it has reached the end point of rotation of the drum 30.

Although details are described later, the projector apparatus 1 according to the first embodiment can change (shift) a projection region of image data, according to a projection angle of the projection lens 12 by rotating the drum unit 10, for example, as indicated in the states 501 to 503 in FIG. 3 while keeping projecting. Thus, a change in a content of a projected image and a projection position on a projection medium of the projected image can be associated with a change in a content and position of an image region that is cut out as an image to be projected in all image regions according to input image data. Therefore, a user can intuitively grasp which region among all of the image regions according to the input image data based on a position of the projected image on the projection medium, and can intuitively perform operation to change the content of the projected image.

Moreover, the optical system includes an optical zoom mechanism, and can enlarge and reduce the size in which a projection image is projected on a projection medium by operating the operating unit 14. In the following, enlarging and reducing the size in which a projection image is projected on a projection medium by the optical system may be simply described as "zoom". For example, when the optical system performs zoom, a projection image is to be enlarged or reduced relative to the optical axis of the optical system as the center, at the time of zoom.

When a user finishes projection of a projection image by the projector apparatus 1 and stops the projector apparatus by performing operation to the operating unit 14 to instruct stop of the projector apparatus 1, rotation control is first performed such that the drum unit 10 returns to the initial orientation. When it is detected that the drum unit 10 faces the perpendicular direction and has returned to the initial orientation, the light source is turned off, and the power source is turned off after a predetermined time that is necessary to cool down the light source. By turning off the power source after the drum unit 10 is directed to the perpendicular direction, it is possible to prevent a lens surface of the projection lens 12 from getting dirty while the apparatus is not used.

Internal Configuration of Projector Apparatus 1

Figure 4:
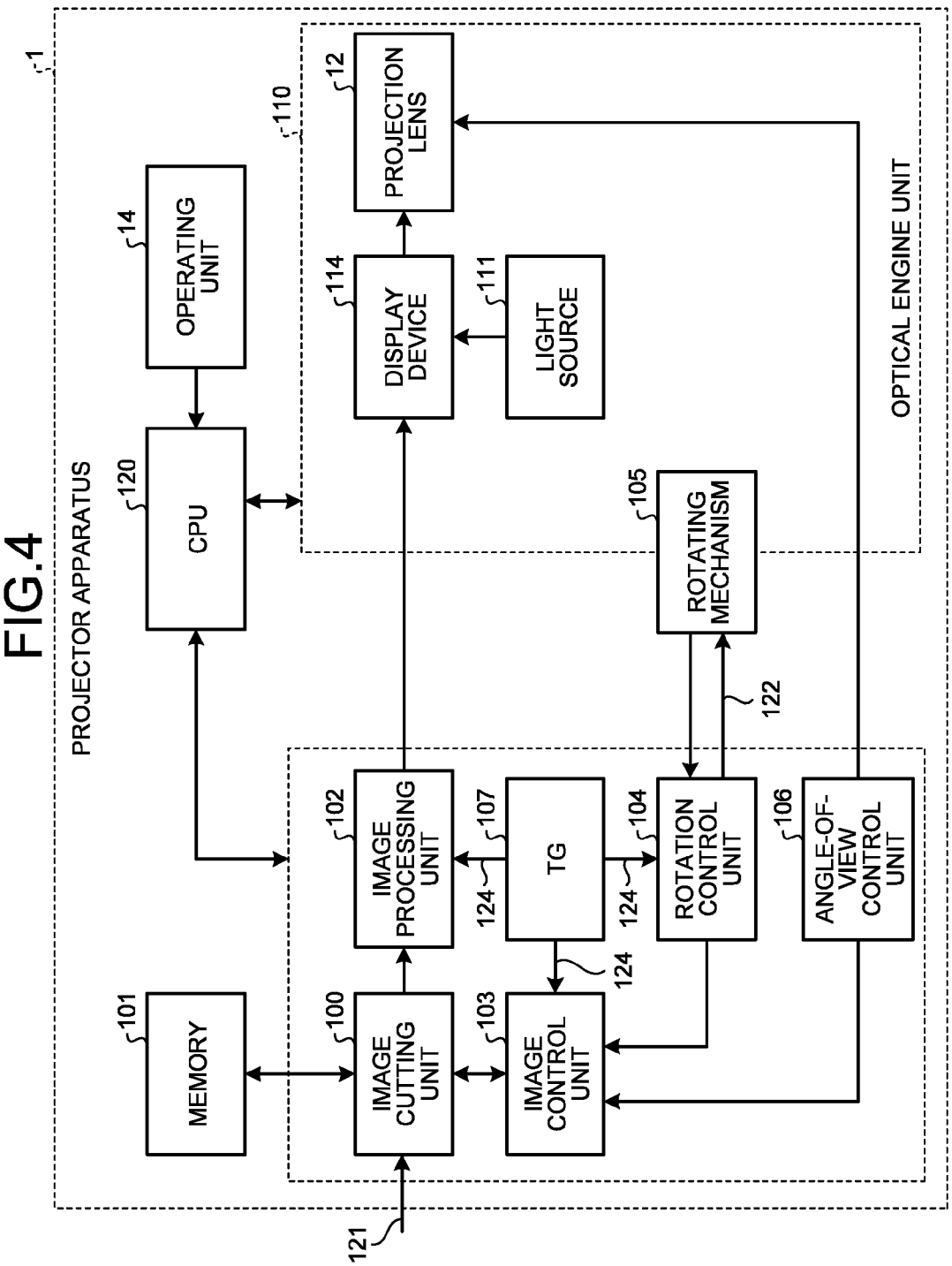
FIG. 4 is a block diagram indicating a configuration of one example of a circuit unit and an optical engine unit according to the first embodiment.

Next, a configuration to achieve the operation of the projector apparatus 1 according to the first embodiment as described above is explained. FIG. 4 indicates a configuration of one example of the circuit unit arranged inside the base 20 and an optical engine unit 110 arranged inside the drum unit 10 in the projector apparatus 1.

The optical engine unit 110 includes a light source 111, display device 114, and the projection lens 12. The light source 111 includes, for example, three light emitting diodes (LEDs) that emit light of red (R), green (G), and blue (B), respectively. Beams of the respective colors of RGB emitted from the light source 111 are irradiated to the display device 114 through respective optical systems not illustrated.

In the following explanation, the display device 114 is a transmission liquid crystal display device, and has, for example, the size of horizontal 1280 pixels×vertical 800 pixels. Of course, the size of the display device 114 is not limited to this example. The display device 114 is driven by a not illustrated driving circuit, and modulates beams of the respective colors of RGB according to image data to emit the beams. The beams of the respective colors of RGB that have been modulated according to the image data and emitted from the display device 114 enter the projection lens 12 through a not illustrated optical system, to be projected to the exterior of the projector apparatus 1.

The display device 114 is not limited to a configuration using a transmission liquid crystal display device. For example, the display device 114 may be configured with a reflection liquid crystal display device using a liquid crystal on silicon (LCOS), or a digital micromirror device (DMD). In this case, the projector apparatus 1 is configured with an optical system and a driving circuit corresponding to the applied display device.

The projection lens 12 includes combined multiple lenses and a lens driving unit that drives the lenses according to a control signal. For example, the lens driving unit drives the lenses included in the projection lens 12 according to a result of measurement of distance based on an output signal from a distance sensor arranged at the window unit 13, and performs focus control. Moreover, the lens driving unit drives the lenses according to a zoom command provided by an angle-of-view control unit 106 described later to change the angle of view, and controls optical zoom.

As described above, the optical engine unit 110 is arranged in the drum unit 10 enabled to rotate 360° by a rotating mechanism 105. The rotating mechanism 105 includes the driving unit 32 explained using FIG. 2, and the gear 35 that is a constituent of the drum unit 10, and rotates the drum unit 10 in a predetermined manner using rotation of the motor 40. That is, by this rotating mechanism 105, the projection direction of the projection lens 12 is changed.

The circuit unit of the projector apparatus 1 includes an image cutting unit 100, a memory 101, an image processing unit 102, an image control unit 103, the rotation control unit 104, the angle-of-view control unit 106, and a timing generator (TG) 107, and a central processing unit (CPU) 120. The timing generator 107 generates a vertical synchronization signal 124, and supplies the generated vertical synchronization signal 124 to the image processing unit 102, the image control unit 103, the rotation control unit 104, and a not illustrated driving circuit that drives the display device 114.

To the CPU 120, a read only memory (ROM) and a random access memory (RAM) illustration of which are both omitted are connected, and the CPU 120 controls various kinds of processing of the projector apparatus 1, such as projecting a projection image, changing a projection angle, and cutting an image, in a centralized manner, according to a program stored in the ROM in advance using the RAM as a work memory.

For example, the CPU 120 controls each part of this projector apparatus 1 according to a program based on the control signal provided by the operating unit 14 according to operation by a user. Accordingly, operation of the projector apparatus 1 according to the operation by a user is enabled. Not limited to this, but the CPU 120 controls each part of the projector apparatus 1, for example, according to a script input from a not illustrated data input unit. Thus, the automatic control of an operation of the projector apparatus 1 is enabled.

Input image data 121 of a still image or a moving image is input to the projector apparatus 1, and is provided to the image cutting unit 100. The image cutting unit 100 stores the provided input image data 121 in the memory 101. The memory 101 stores the input image data 121 in a unit of an image. Specifically, when the input image data 121 is still image data, corresponding data is stored in a unit of a single piece of still image, and when the input image data 121 is moving image data, corresponding data is stored in a unit of a frame image constituting the moving image. For example, the memory 101 is enabled to store one or more pieces of frame images of 1920 pixels×1080 pixels corresponding to the standards of digital high-definition broadcasting. The image cutting unit 100 cuts out (extracts) an image region that is specified by the image control unit 103 from the entire region of a frame image according to the input image data 121 stored in the memory 101, to output as image data.

It is preferable that the input image data 121 be adjusted into a size corresponding to a unit of storage of image data in the memory 101 to be input to the projector apparatus 1. In this example, the input image data 121 is adjusted into an image size of 1920 pixels×1080 pixels in advance, to be input to the projector apparatus 1. It is not limited thereto, and an image adjusting unit that adjusts the input image data 121 that has been input in an arbitrary size into image data of a size of 1920 pixels×1080 pixels may be arranged in a stage prior to the image cutting unit 100 of the projector apparatus 1.

The image data output from the image cutting unit 100 is provided to the image processing unit 102. The image processing unit 102 outputs the image data subjected to image processing based on timing indicated in the vertical synchronization signal 124 provided by the timing generator 107.

The image processing unit 102 performs image processing on the provided image data using, for example, a not illustrated memory. For example, the image processing unit 102 performs size conversion processing on the image data provided by the image cutting unit 100 so as to conform to the size of the display device 114. The image processing unit 102 can perform various kinds of image processing other than that. For example, the size conversion processing for image data can be performed using a general linear transformation processing. Note that when the size of image data provided by the image cutting unit 100 conforms to the size of the display device 114, the image data can be output as it is.

Furthermore, the image processing unit 102 can also perform processing about so called key-stone correction on image to be projected.

Moreover, it is possible to enlarge a part or a whole of an image by using a interpolation filter having a predetermined characteristic by interpolating (oversampling) with a constant aspect ratio of an image, to reduce the size of a part of a whole of an image by thinning out (subsampling) with a low-pass filter corresponding to a reduction rate to remove aliasing, or to maintain the size as it is without filtering.

Furthermore, to prevent an image from being blurry by defocusing at a peripheral area when an image is projected in an oblique direction, edge emphasizing processing by an operator such as Laplacian, or edge emphasizing processing by using a one-dimensional filter in a horizontal direction and a vertical direction can be performed. By this edge emphasizing processing, an edge of a projected and blurred part of an image can be emphasized.

Moreover, to prevent variations in brightness of a whole image as a result of changing a projection size (area) by the key-stone correction described above, adaptive brightness adjustment can be performed so as to maintain the brightness uniform. Further, when a peripheral portion of projected image texture includes oblique lines, the image processing unit 102 shades off edge jaggies by adding local halftone or by local low-pass filtering so that the edge jaggies are not noticeable, and thereby preventing the oblique line from being observed as jagged lines.

The image data output from the image processing unit 102 is provided to the display device 114. Actually, this image data is provided to the driving circuit that drives the display device 114. The driving circuit drives the display device 114 based on the provided image data and the vertical synchronization signal 124. For example, the driving circuit updates a display by the display device 114 according to timing of the vertical synchronization signal 124 that is provided by the timing generator 107.

The rotation control unit 104 generates a driving pulse 122 of a predetermined pulse width to drive the motor 40 that is a stepping motor, for example, according to an instruction from the CPU 120 that has responded to operation made by a user to the operating unit 14, to provide to the rotating mechanism 105. The rotation control unit 104 generates the driving pulse 122 synchronously with the vertical synchronization signal 124 provided by the timing generator 107.

The rotating mechanism 105 includes the driving unit 32, and the photointerrupters 51a and 51b described above. In the rotating mechanism 105, the driving unit 32 drives the motor 40 according to the driving pulse 122 that is provided by the rotation control unit 104, to control rotation operation of the drum unit 10 (drum 30).

On the other hand, output of the photointerrupters 51a and 51b described above are provided to the rotation control unit 104 from the rotating mechanism 105. The rotation control unit 104 includes, for example, a counter, and counts pulse number of the driving pulse 122. The rotation control unit 104 acquires timing of detection of the protrusion 46a based on the output of the photointerrupter 51b, and resets the pulse number counted in the counter at this timing of detection of the protrusion 46a. The rotation control unit 104 can successively acquire an angle of the drum unit 10 (drum 30) based on the pulse number counted by the counter, and can acquire the orientation (angle) of the drum unit 10. Information indicating the angle of the drum unit 10 is provided to the image control unit 103. As described, when the projection direction of the projection lens 12 is changed, the rotation control unit 104 can derive an angle between a projection direction before the change and a projection direction after the change.

The angle-of-view control unit 106 instructs a zoom instruction, that is, a change instruction of an angle of view, to the projection lens 12, for example, according to a command from the CPU 120 that has responded to operation made by a user to the operating unit 14. The lens driving unit of the projection lens 12 drives lenses according to this zoom instruction, and performs zoom control. The angle-of-view control unit 106 provides information about an angle of view that is derived from the zoom instruction, a zoom magnification according to the zoom instruction, and the like, to the image control unit 103.

The image control unit 103 specifies an image cut-out region cut by the image cutting unit 100 based on the information about the angle that is provided by the rotation control unit 104 and the information about an angle of view that is provided by the angle-of-view control unit 106. At this time, the image control unit 103 specifies a cut-out region in image data based on a line position according to the angle between the projection directions of the projection lens 12 before and after the change. The image control unit 103 specifies the image cut out region to the image cutting unit 100. The image control unit 103 instructs the image cutting unit 100 to read of image data from the specified image cut-out region in synchronization with the vertical synchronization signal 124 provided by the timing generator 107.

Although it has been explained as if the image cutting unit 100, the image processing unit 102, the image control unit 103, the rotation control unit 104, and the angle-of-view control unit 106 are separate hardware in the above description, it is not limited to this example. For example, each of these components may be implemented by a module of a program that operates on the CPU 120.

Cut-Out Processing of Image Data

Figure 5:
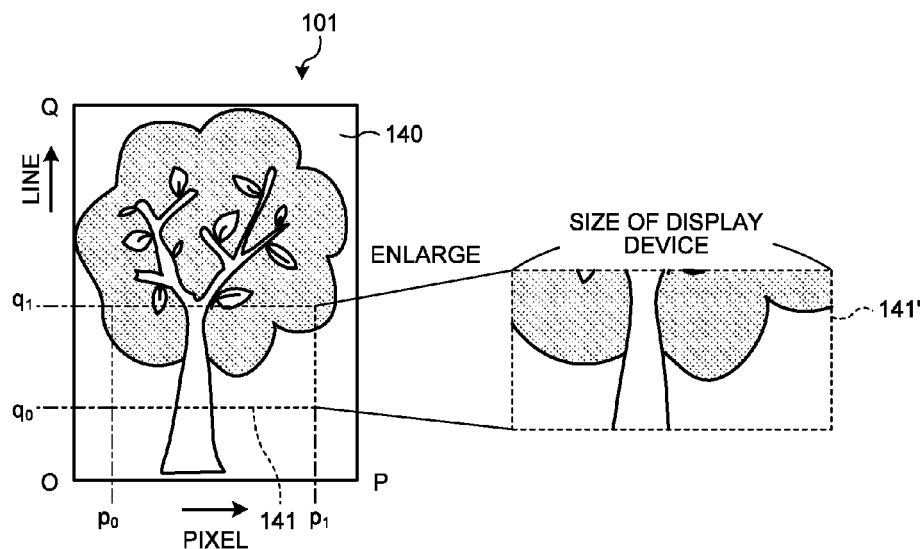
FIG. 5 is a diagram schematically indicating cut-out processing of image data to be stored in a memory according to the first embodiment.

Next, cut-out processing of image data that is stored in the memory 101 performed by the image control unit 103 and the image cutting unit 100 according to the first embodiment is explained. FIG. 5 is a conceptual diagram for explaining the cut-out processing of image data that is stored in the memory 101 according to the first embodiment. Referring to a drawing on the left side of FIG. 5, an example of cutting out image data 141 of specified cut-out region from image data 140 that is stored in the memory 101 is explained.

In the memory 101, an address is set, for example, in a line unit in a vertical direction, and in a pixel unit in a horizontal direction. Addresses of lines increase from a lower end to an upper end of an image (screen), and address of pixels increase from a left end to a right end of an image.

The image control unit 103 performs address specification to specify, to the image cutting unit 100, addresses to lines $q_0$ and $q_1$ in the vertical direction, and pixels $p_0$ and $p_1$ in the horizontal direction, as a cut-out region of the image data 140 of Q lines×P pixels that is stored in the memory 101. The image cutting unit 100 reads each line in a range of the lines $q_0$ to $q_1$, from the pixels $p_0$ to $p_1$ from the memory 101 according to this address specification. At this time, as for the reading sequence, for example, each line is read from the upper end toward the lower end of the image, and each pixel is read from the left end toward the right end of the image. Details of access control to the memory 101 are described later.

The image cutting unit 100 provides, to the image processing unit 102, the image data 141 in the range of the lines $q_0$ to $q_1$ and the pixels of $p_0$ to $p_1$ that is read out from the memory 101. The image processing unit 102 performs the size conversion processing to adjust the size of an image of the provided image data 141 so as to match with the size of the display device 114. As an example, when the size of the display device 114 is V lines×H pixels, maximum magnification m that satisfies both Equation (1) and Equation (2) below is acquired. The image processing unit 102 then enlarges the image data 141 with this magnification m, to acquire image data 141' the size of which is changed as exemplified on a right side of FIG. 5.

$$m \times (p_1 - p_0) \leq H \quad (1)$$

$$m \times (q_1 - q_0) \leq V \quad (2)$$

Figure 6:
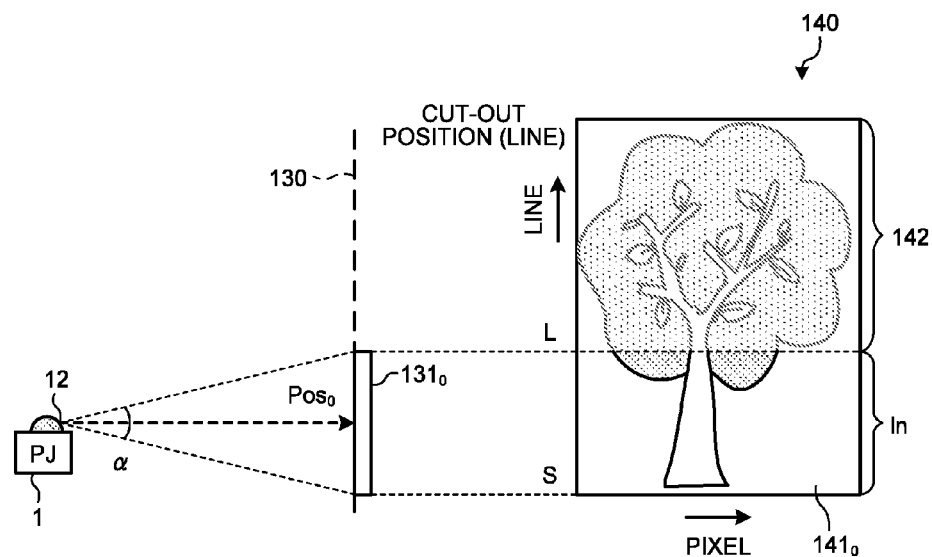
FIG. 6 is a diagram indicating an example of specification of a cut-out region when the drum unit according to the first embodiment is at an initial position.

Next, specification (update) of a cut-out region according to a projection angle according to the first embodiment is explained. FIG. 6 illustrates an example of specifying a cut-out region when the drum unit 10 is in 0°-orientation, that is, when the projection angle is 0°. In the projector apparatus (PJ) 1, a projection position when an image $131_0$ is projected at the projection angle 0° to a projection surface 130 that is a projection medium such as a screen from the projection lens 12 with an angle of view α is determined as a position $Pos_0$ corresponding to the center of a beam of light that is projected from the projection lens 12. Moreover, with the projection angle 0°, an image of image data from an S-th line at the lower end to an L-th line of a region that is specified in advance to perform projection in the orientation of the projection angle 0° in image data stored in the memory 101 is to be projected. In the region from the S-th line to the L-th line, the number ln of lines are included. Furthermore, a value that indicates a position of a line such as the S-th line and the L-th line is, for example, a value that increases from a lower end toward an upper end of the display device 114, defining a line at the lower end of the display device 114 as a 0-th line.

The number of lines ln is the number of lines in a maximum effective region of the display device 114. Moreover, the angle of view α is an angle in the vertical direction in which the projection image is viewed from the projection lens 12 in a case where an image is projected when the effective region in the vertical direction in which display is effective in the display device 114 takes the maximum value, that is, in a case where the image with the number of lines ln is projected.

The angle of view α and the effective region of the display device 114 are explained with more specific examples. Assume that the display device 114 has the size in the vertical direction of 800 lines. For example, when the size in the vertical direction of projection image data is 800 lines, and projection of the projection image data is performed using all of the lines of the display device 114, the effective region in the vertical direction of the display device 114 takes the maximum value of 800 lines (=the number of lines ln). The angle of view α is an angle in which 1 to 800 lines of the projection image are viewed from the projection lens 12 in this case.

Moreover, a case in which the size in the vertical direction of projection image data is 600 lines and projection of the projection image data is performed by using only 600 lines out of 800 lines (=the number of lines ln) of the display device 114 is possible. At this time, the effective region in the vertical direction of the display device 114 is 600 lines. In this case, only a part of the effective region of the projection image data relative to the maximum value of the effective region of the angle of view α is projected.

The image control unit 103 instructs the image cutting unit 100 to cut out and read from a line S to a line L of the image data 140 stored in the memory 101. In this example, in the horizontal direction, the image data 140 is all read from the left end to the right end. The image cutting unit 100 sets a region from the S-th line to the L-th line of the image data 140 as the cut-out region according to the instruction from the image control unit 103, and reads the image data 141 of the set cut-out region to provide to the image processing unit 102. In the example of FIG. 6, the image $131_0$ corresponding to an image data $141_0$ having the number of lines ln from the S-th line to the L-th line in the image data 140 is projected at the projection position $Pos_0$ on the projection surface 130. In this case, an image corresponding to image data 142 in a region of the L-th line to the upper end line out of the entire region of the image data 140 is not projected.

Next, a case in which the projection angle of the projection lens 12 becomes the angle θ, for example, as a result of rotation of the drum unit 10 caused by operation made by a user to the operating unit 14 is explained. In the first embodiment, the image control unit 103 specifies a cut-out region according to the projection angle θ to the image data 140 in the memory 101 at timing synchronized with the vertical synchronization signal 124.

Figure 7:
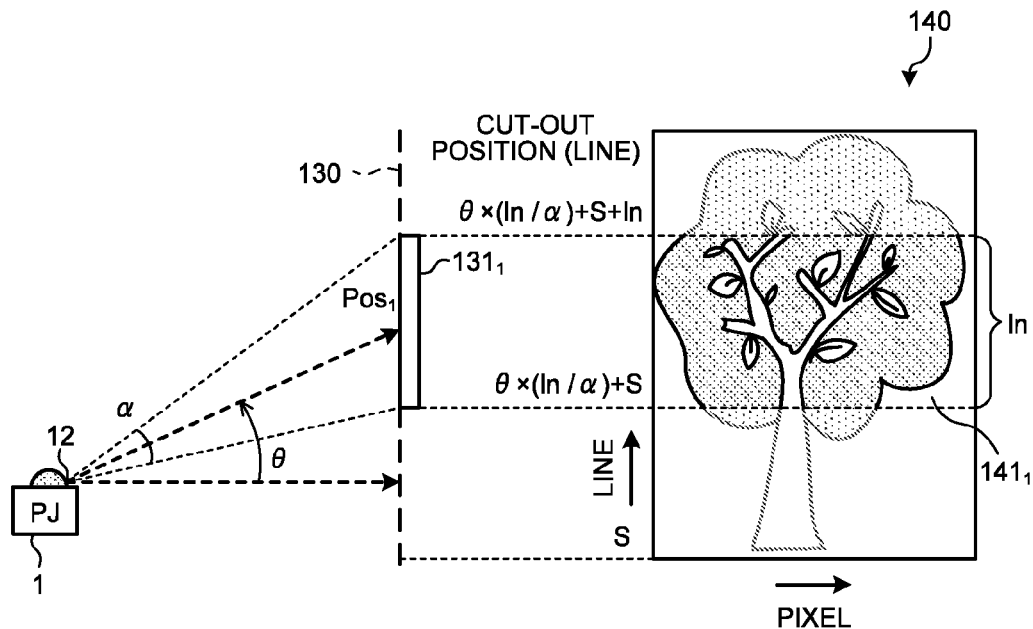
FIG. 7 is a diagram for explaining setting a cut-out region for a projection angle θ according to the first embodiment.

Setting of a cut-out region for the projection angle θ is specifically explained with reference to FIG. 7. For example, a case in which the drum unit 10 is rotated in the forward direction from the projection position by the projection lens 12 being the 0°-orientation so that the projection angle of the projection lens 12 becomes the angle θ (>0°) is considered. In this case, the projection position to the projection surface 130 shifts to a projection position $Pos_1$ that is above the projection position $POS_0$ with the projection angle 0°. At this time, the image control unit 103 specifies a cut-out region of the image data 140 that is stored in the memory 101, to the image cutting unit 100, according to following Equation (3) and Equation (4). Equation (3) indicates an $R_s$-th line at the lower end of the cut-out region and Equation (4) indicates an $R_L$-th line at the upper end of the cut-out region.

$$R_s = \theta \times (\ln/\alpha) + S \quad (3)$$

$$R_L = \theta \times (\ln/\alpha) + S + \ln \quad (4)$$

In Equation (3) and Equation (4), the value ln and the value α indicate the number of lines ln and the angle of view α, respectively. Moreover, the value S indicates a value that indicates a position of a line at the lower end of the cut-out region in the 0°-orientation explained using FIG. 6.

In Equation (3) and Equation (4), (ln/α) indicates the number of lines per unit angle of view (including a concept of the substantially averaged number of lines that varies according to the shape of a projection surface) when the number of lines ln corresponding to the angle of view α are projected. Therefore, θ×(ln/α) indicates the number of lines corresponding to the projection angle θ of the projection lens 12. This means that when the projection angle varies by an angle Δθ, the position of a projection image is shifted by a distance corresponding to the number of lines {Δθ×(ln/α)} in the projection image. Accordingly, Equation (3) and Equation (4) indicate the positions of lines at the lower end and the upper end in the image data 140 of the projection image when the projection angle is the angle θ. This corresponds to a read-out address for the image data 140 in the memory 101 at the projection angle θ.

As described, in the first embodiment, an address when the image data 140 is read from the memory 101 is specified according to the projection angle θ. Thus, for example, in the example shown in FIG. 7, image data $141_1$ at a position according to the projection angle θ of the image data 140 is read from the memory 101, and an image $131_1$ according to the image data $141_1$ is projected at a projection position $Pos_1$ corresponding to the projection angle θ on the projection surface 130.

Thus, according to the first embodiment, when the image data 140 in the size larger than the size of the display device 114 is projected, correspondence between a position in a projected image and a position in the image data is maintained. Moreover, because the projection angle θ is acquired based on the driving pulse 122 of the motor 40 to drive the drum 30 to be rotated, the projection angle θ can be acquired with substantially no delay relative to rotation of the drum unit 10, and the projection angle θ can be acquired independent of a projection image or surroundings.

Next, setting of a cut-out region when optical zoom by the projection lens 12 is performed is explained. As already explained, in the case of the projector apparatus 1, optical zoom is achieved by driving the lens driving unit to increase or reduce the angle of view α of the projection lens 12. An increased amount of the angle of view by the optical zoom is the angle Δ, and the angle of view of the projection lens 12 after the optical zoom is (α+Δ).

In this case, even if the angle of view is increased by the optical zoom, the cut-out region to the memory 101 does not change. In other words, the number of lines included in the projection image with the angle of view α before the optical zoom and the number of lines included in the projection image with the angle of view (α+Δ) after the optical zoom are the same. Therefore, after the optical zoom, the number of lines included in a unit angle changes from that before the optical zoom.

Figure 8:
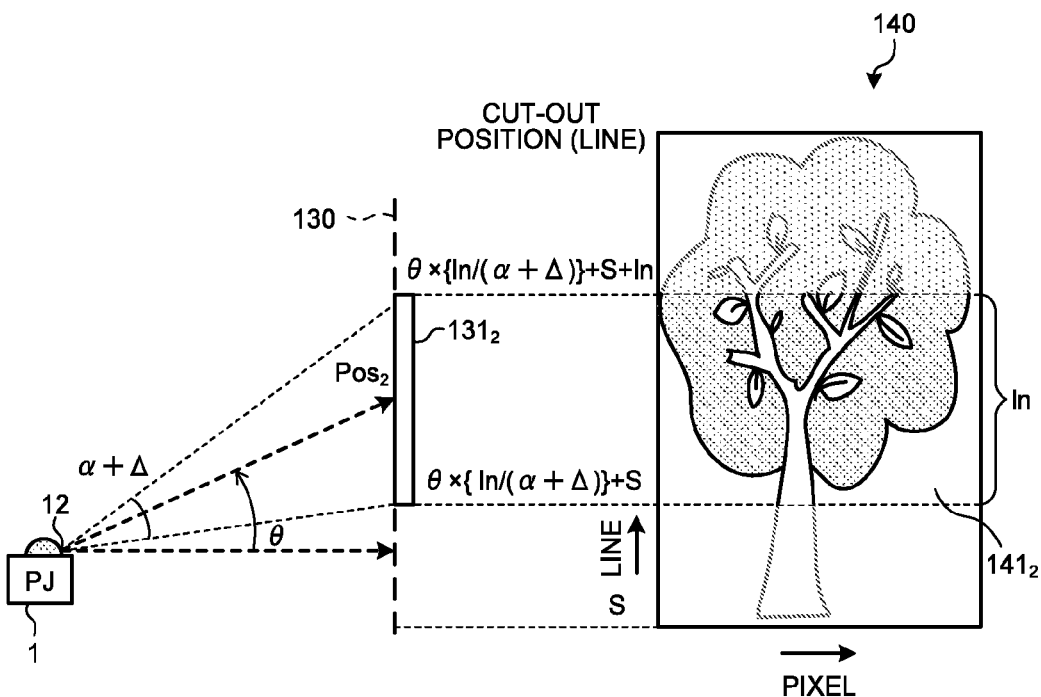
FIG. 8 is a diagram for explaining specification of a cut-out region when optical zoom is performed according to the first embodiment.

Specification of a cut-out region when the optical zoom is performed is more specifically explained using FIG. 8. In an example shown in FIG. 8, the optical zoom to increase the angle of view α by the angle of view Δ is performed when the projection angle is θ. By performing the optical zoom, the projection image that is projected on the projection surface 130 is enlarged by the angle of view Δ from that when the optical zoom is not performed, as indicated as an image $131_2$, with respect to a common beam center (projection position $Pos_2$) of light emitted to the projection lens 12, for example.

When the optical zoom corresponding to the angle of view Δ is performed, if the number of lines specified as a cut-out region to the image data 140 is ln lines, the number of lines included in a unit angle is expressed by $\{ln/(\alpha+\Delta)\}$. Therefore, the cut-out region to the image data 140 is specified by following Equation (5) and Equation (6). Meaning of each variable in Equation (5) and Equation (6) is common with Equation (3) and Equation (4) described above.

$$R_s=\theta\times\{ln/(\alpha+\Delta)\}+S \tag{5}$$

$$R_L=\theta\times\{ln/(\alpha+\Delta)\}+S+ln \tag{6}$$

Image data $141_2$ of a region indicated by these Equation (5) and Equation (6) are read from the image data 140, and the image $131_2$ according to the read image data $141_2$ is projected at the projection position $Pos_2$ on the projection surface 130 by the projection lens 12.

As described, when the optical zoom is performed, the number of lines included in a unit angle changes from that of a case in which the optical zoom is not performed, and an amount of change of lines to change of the projection angle θ differs from that in a case in which the optical zoom is not performed. This is a state in which the gain corresponding to the angle of view Δ that is increased by the optical zoom is changed in specification of a read-out address according to the projection angle θ to the memory 101.

In the first embodiment, an address at the time of reading the image data 140 from the memory 101 is specified according to the projection angle θ and the angle of view α of the projection lens 12. This enables to specify an address of the image data $141_2$ to be projected appropriately to the memory 101 even when optical zoom is performed. Therefore, even if optical zoom is performed, when the image data 140 having the size larger than the size of the display device 114 is projected, correspondence between a position in a projected image and a position in the image data is maintained.

Figure 9:
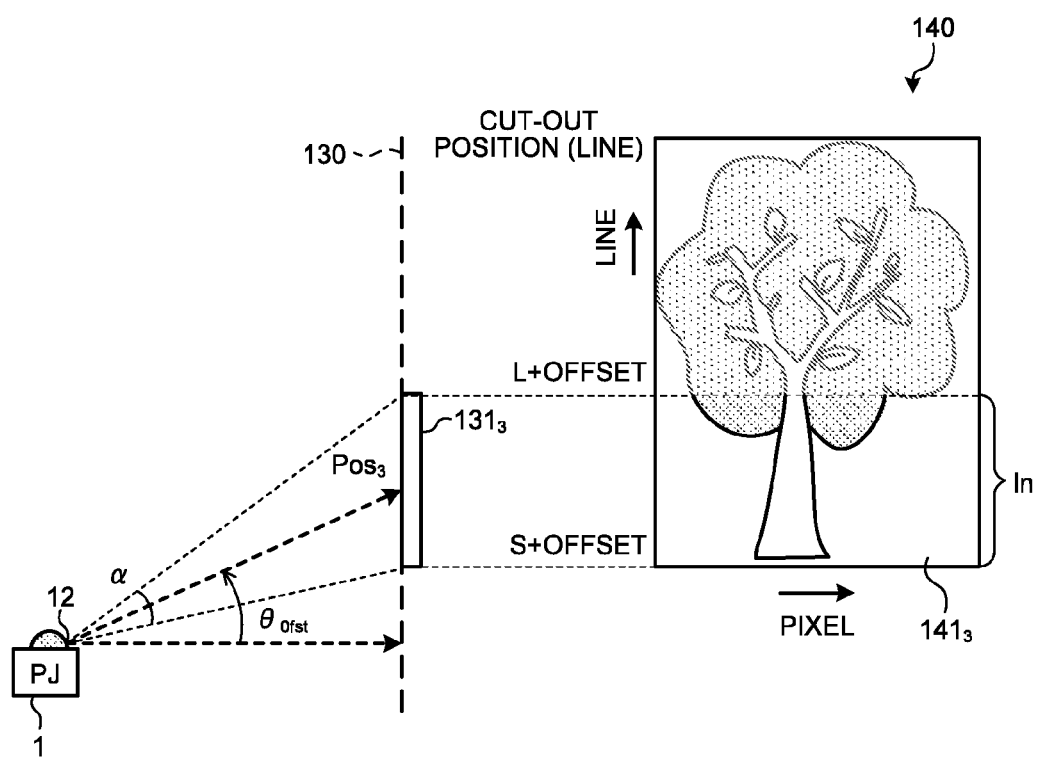
FIG. 9 is a diagram for explaining a case in which an offset is given to a projection position of an image according to the first embodiment.

Next, a case in which offset is given to a projection position of an image is explained using FIG. 9. When the projector apparatus 1 is used, the 0°-orientation (the projection angle 0°) is not necessarily the lowest end of a projection position. For example, as exemplified in FIG. 9, a case in which a projection position $Pos_3$ with a predetermined projection angle $\theta_{ofst}$ corresponds to the lower end of a projection position can also be considered. In this case, an image $131_3$ corresponding to image data $141_3$ is projected at a position that is shifted upward by a height corresponding to the projection angle $\theta_{ofst}$, compared to a case in which offset is not given. The projection angle θ when an image the lowest end of which corresponds to a line at the lowest end of the image data 140 is projected is referred to as an offset angle $\theta_{ofst}$ by the offset.

In this case, for example, specifying a cut-out region to the memory 101 assuming that this offset angle $\theta_{ofst}$ is the projection angle 0° is considered. If Equation (3) and Equation (4) described above are applied, following Equation (7) and Equation (8) are obtained. Meaning of each variable in Equation (7) and Equation (8) is common with Equation (3) and Equation (4) described above.

$$R_s=(\theta-\theta_{ofst})\times(ln/\alpha)+S \tag{7}$$

$$R_L=(\theta-\theta_{ofst})\times(ln/\alpha)+S+ln \tag{8}$$

The image data $141_3$ of a region indicated by these Equation (7) and Equation (8) is read from the image data 140, and the image $131_3$ according to the read image data $141_3$ is projected at the projection position $Pos_3$ on the projection surface 130 by the projection lens 12.

A method of specifying a cut-out region by Equation (3) and Equation (4) described above is based on a cylindrical model in which the projection surface 130 on which projection is performed by the projection lens 12 is assumed as a cylinder having the rotation axis 36 of the drum unit 10 as a center. However, in the actual state, it is considered that in most of the cases, the projection surface 130 is a vertical surface that forms 90° angle relative to the projection angle θ=0° (hereinafter, simply "vertical surface"). When image data having the same number of lines is cut out from the image data 140 and is projected on a vertical surface, the image projected on the vertical surface stretches in a vertical direction as the projection angle θ increases. Therefore, after the image cutting unit 100, the image processing unit 102 performs following image processing.

Figure 10:
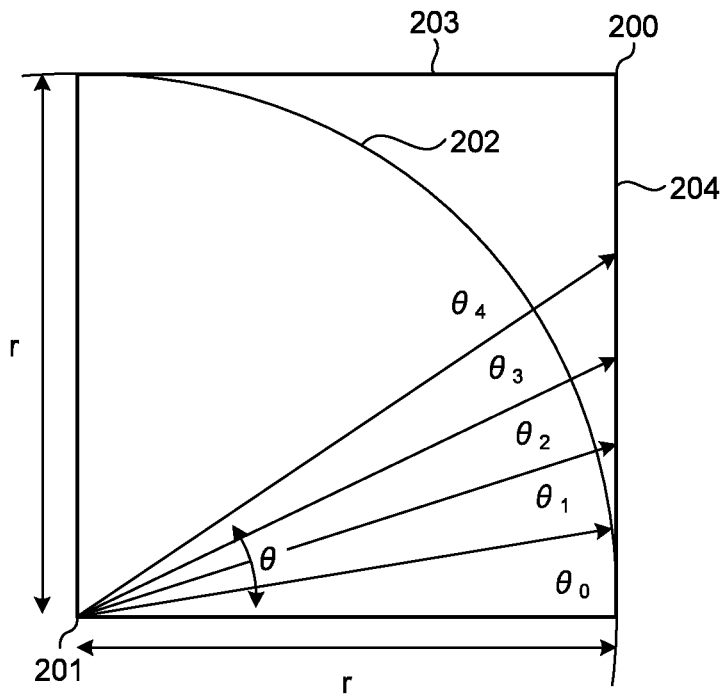
FIG. 10 is a diagram for explaining an image projected on a vertical surface according to the first embodiment.
Figure 11:
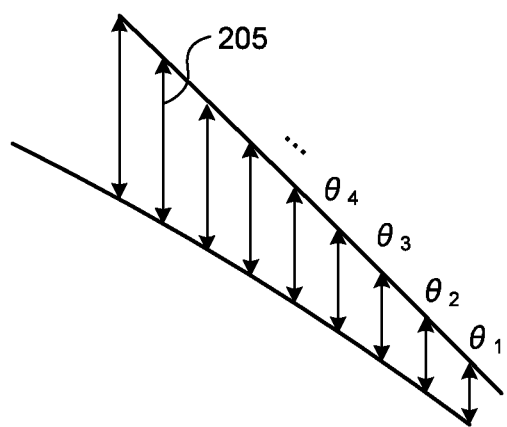
FIG. 11 is a diagram for explaining an image projected on a vertical surface according to the first embodiment.

An image that is projected on a vertical surface is explained using FIG. 10 and FIG. 11. In FIG. 10, a case is considered in which an image is projected from the projection lens 12 on a projection surface 204 that is distant from a position 201 by a distance r when the position 201 is at a position of the rotation axis 36 of the drum unit 10.

In the above cylindrical model, a projection image is projected on an arc 202 having a radius r from the position 201 as the center of a projection surface. Each of points of the arc 202 is at the same distance from the position 201, and a beam center of light that is projected from the projection lens 12 is on a radius of a circle including the arc 202 and matches a center of the projection image. Therefore, the even if the projection angle θ is increased from an angle $θ_0$ of 0° to an angle $θ_1$, an angle $θ_2$, . . . , the projection image is always projected in the same size on the projection surface.

On the other hand, when an image is projected from the projection lens 12 to the projection surface 204, which is a vertical surface, if the projection angle θ is increased from the angle $θ_0$ to the angle $θ_1$, the angle $θ_2$, . . . , a position at which the beam center of light that should be projected from the projection lens 12 to the center of the projection image in the cylindrical model is irradiated on the projection surface 204 changes by a function of the angle θ according to the characteristics of the tangent function. Accordingly, the projection image is stretched upward according to a ratio M indicated in following Equation (9) as the projection angle θ increases.

$$M=(180×\tan θ)/(θ×π) \quad (9)$$

According to Equation (9), for example, when the projection angle θ=45°, the projection image is to be stretched at a ratio of approximately 1.27 times. Furthermore, when a projection surface W is higher compared to the length of the radius r and projection at the projection angle θ=60° is possible, the projection image is to be stretched at a ratio of approximately 1.65 times at the projection angle θ=60°.

Moreover, as exemplified in FIG. 11, a line interval 205 in the projection image on the projection surface 204 also increases as the projection angle θ increases. In this case, the line interval 205 increases according to Equation (9) above, according to a position on the projection surface 204 in one projection image.

Therefore, the projector apparatus 1 performs reduction processing on image data of an image to be projected at a ratio of the inverse of Equation (9) above, according to the projection angle θ of the projection lens 12. It is preferable that this reduction processing be performed for a size a little larger than image data that is cut out based on the cylindrical model. That is, although depending on the height of the projection surface 204, which is a vertical surface, because the projection image is stretched at a ratio of approximately 1.27 times when the projection angle θ=45°, reduction is performed to about 78% that is the inverse thereof. To make full use of an image memory, it is preferable that about 22% or more number of lines is cut out in advance, and a region larger than a region of image data that corresponds to an image to be projected is read as an image of a cut-out region, to be input to the image processing unit 102.

As an example, when the image data input to the projector apparatus 1 is stored in the memory 101 by the image cutting unit 100, the image control unit 103 performs reduction processing on the image data in advance for each line of an image at the time of projecting the image data using the ratio of the inverse of Equation (9) above. In the reduction processing, lines are thinned out by performing low-pass filtering with a low-pass filter with several taps on lines (pixels in the vertical direction) at a reduction rate dependent on the projection angle θ. To be exact, in the low-pass filtering processing, it is preferable that a limit value of the band of the low-pass filter is changed depending on the projection angle θ. Not limited to these, a general linear interpolation in which a filter characteristic is determined uniformly by a reduction rate corresponding to the maximum projection angle θ, or in which a filter characteristic is determined uniformly by a reduction rate corresponding to approximately ½. Furthermore, it is preferable that after the filtering processing, sub-sampling is performed depending on the projection angle θ in a screen at thinned-out lines. Not limited to this, processing in which thinning out is performed uniformly by a reduction rate corresponding to the maximum projection angle θ, in which thinning out is performed uniformly by a reduction rate corresponding to approximately ½ of the maximum projection angle θ, or the like can also be performed. To perform the low-pass filtering processing and the thinning out processing more accurately, image data is divided into some areas in the direction of lines, and each of the divided areas is processed uniformly, thereby acquiring better characteristic.

The image processing using this Equation (9) is not limited to the example performed at the time of storing image data in the memory 101. This image processing can be performed, for example, by the image processing unit 102.

Furthermore, in an actual use environment of the projector apparatus 1, it is thought that there are many cases in which the projection surface 204 has a limit in height and is bent at 90° angle at a position 200 at a predetermined height to form a surface 203. This surface 203 can also be used as a projection surface of the projector apparatus 1. In this case, an image projected on the projection surface 203 shrinks by an inverse characteristic to the image projected on the projection surface 204 described above as the projection position moves toward a vertically upward direction (projection angle θ=90°), exceeding the position 200.

Therefore, an image of the image data is projected at the projection angles of 0° and 90°, the reduction processing using Equation (9) on the image data to be projected should not be performed. Moreover, when length (height) of the projection surface 204 and length of a projection surface R are substantially equal to each other, the reduction processing using Equation (9) on the image data to be projected is performed as symmetric processing with reduction processing from the projection angle 0° to the position 200 at the highest part of the projection surface 204 and reduction processing from the position 200 to the projection angle 90°. Thus, a load of the reduction processing in the image control unit 103 can be reduced.

In the above example, explanation has been given assuming a vertical surface that forms an angle of 90° relative to the projection angle θ=0°. According to the rotation angle of the drum unit 10, projection on a flat surface forming an angle of 180° relative to the projection angle θ=0° can also be considered. When image data having the same number of lines is cut out from the image data 140 and projected on this surface, a projected image is to shrink in a vertical direction as projection angle θ increases. Therefore, following the image cutting unit 100, inverse image processing to the above explanation is performed at the image processing unit 102.

Specifically, when the projection angle θ is increased from the angle $θ_0$ to the angle $θ_1$, the angle $θ_2$, . . . , a distance from the projection lens 12 to the projection surface changes to be small. Therefore, the projector apparatus 1 performs enlargement processing on the image data of an image to be projected inversely to the above explanation according to the projection angle θ of the projection lens 12.

As described, when a distance from the projection lens 12 to a projection surface decreases as the projection direction changes from a first projection direction to a second projection direction, the image cutting unit 100 of the projector apparatus 1 can perform the enlargement processing based on the projection angle θ for each pixel of cut-out image data.

In the following, unless otherwise specified, description of angles are based on the cylindrical model, and in a case of projecting on a vertical surface or the like, correction based on Equation (9) is appropriately performed as necessary.

About Memory Control

Next, access control of the memory 101 is explained using FIG. 12 to FIG. 15. Image data is transmitted at each of the vertical synchronization signal 124, in such a manner that each of pixels is sequentially transmitted from a left end to a right end of an image for each line in a horizontal direction on a screen, and each line is sequentially transmitted from an upper end to a lower end of the image. In the following, a case in which image data has the size of horizontal 1920 pixels×vertical 1080 pixels (lines) that conforms to digital high-definition standard is explained as an example. Moreover, in the following, unless otherwise specified, the vertical synchronization signal 124 is explained as a vertical synchronization signal VD.

Figure 12:
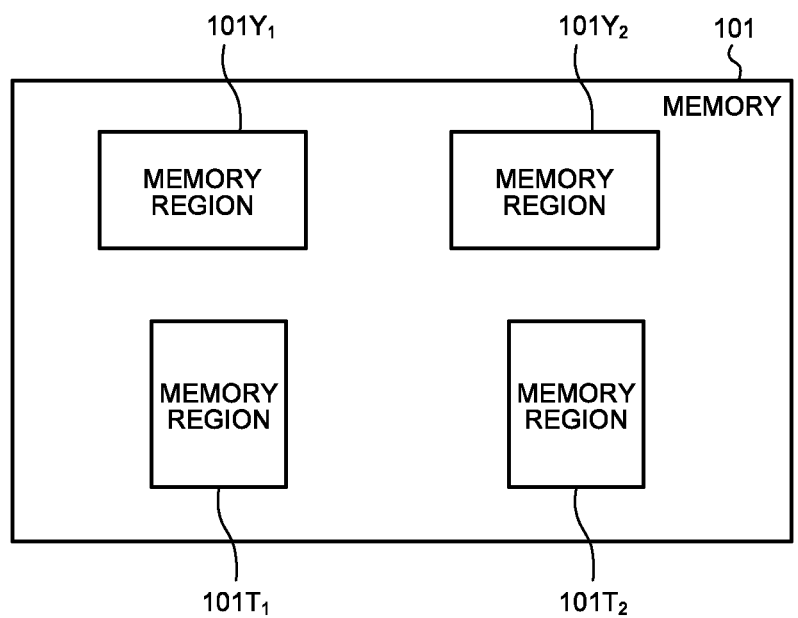
FIG. 12 is a diagram for explaining access control of the memory according to the first embodiment.

In the following, an example in which the memory 101 includes four memory regions $101Y_1$, $101Y_2$, $101T_1$, and $101T_2$ for which access control is enabled independently is explained. Specifically, as indicated in FIG. 12, the memory 101 includes the memory regions 101Y1 and $101Y_2$ that are respectively used to write and read image data in the size of horizontal 1920 pixels×vertical 1080 pixels (lines), and the memory regions $101T_1$, and $101T_2$ that are used to write and read image data in the size of horizontal 1080 pixels×vertical 1920 pixels (lines). Hereinafter, the respective memory regions $101Y_1$, $101Y_2$, $101T_1$, and $101T_2$ are explained as a memory region $Y_1$, a memory region $Y_2$, a memory region $T_1$, and a memory region $T_2$.

FIG. 13 is an example of a time chart for explaining access control to the memory 101 by the image cutting unit 100 according to the first embodiment. A chart 210 indicates the projection angle θ of the projection lens 12, a chart 211 indicates the vertical synchronization signal VD. Moreover, a chart 212 indicates input timing of image data $D_1$, $D_2$, . . . that are input to the image cutting unit 100, and a chart 213 to a chart 216 indicate examples of accesses from the image cutting unit 100 to the memory regions $Y_1$, $T_1$, $Y_2$, and $T_2$, respectively. In the chart 213 to the chart 216, blocks to which "R" is added indicate read, and blocks to which "W" is added indicate write.

To the image cutting unit 100, image data $D_1$, $D_2$, $D_3$, $D_4$, $D_5$, $D_6$, . . . respectively having the image size of 1920 pixels×1080 lines are input for each of the vertical synchronization signal VD. Each of the image data $D_1$, $D_2$, . . . is synchronized with the vertical synchronization signal VD, and input following the vertical synchronization signal VD. Furthermore, a projection angle of the projection lens 12 corresponding to each of the vertical synchronization signal VD is referred to as projection angles $θ_1$, $θ_2$, $θ_3$, $θ_4$, $θ_5$, $θ_6$, . . . . Thus, the projection angle θ is acquired for each of the vertical synchronization signal VD.

First, the image data $D_1$ is input to the image cutting unit 100. The projector apparatus 1 according to the first embodiment, as described above, shifts a projection position of a projection image by changing the projection angle θ of the projection lens 12 by rotating the drum unit 10, and specifies a read-out position of the image data according to the projection angle θ. Therefore, image data longer in the vertical direction is suitable. Generally, image data has the size in the horizontal direction longer than the size in the vertical direction in many cases. Accordingly, for example, it is considered that a user images, rotating a camera by 90°, and image data that is acquired by this imaging is input to the projector apparatus 1.

Figure 14A:
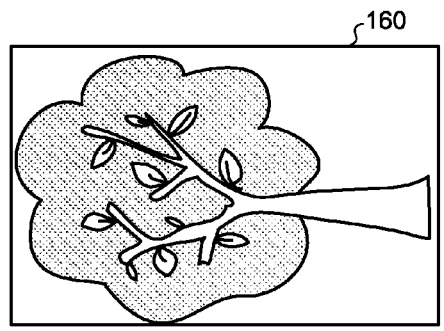
FIG. 14A is a diagram for explaining the access control of the memory of the first embodiment.
Figure 14B:
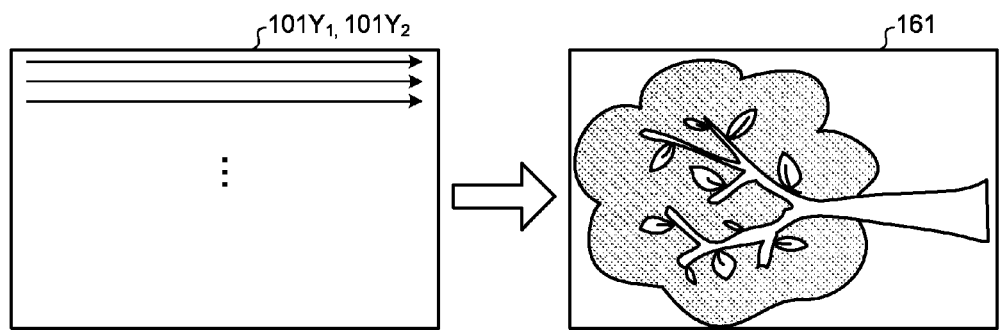
FIG. 14B is a diagram for explaining the access control of the memory of the first embodiment.

That is, images according to the image data $D_1$, $D_2$, . . . that are input to the image cutting unit 100 are a sideways-turned image that is an image rotated by 90° from a right orientation determined from contents of the image, as an image 160 indicated as an image in FIG. 14A.

The image cutting unit 100 first writes the input image data $D_1$ to the memory region $Y_1$ at timing $WD_1$ (timing $WD_1$ in the chart 213) corresponding to input timing of the image data $D_1$. The image cutting unit 100 writes the image data $D_1$ into the memory region $Y_1$ in sequence of lines in the horizontal direction as indicated on a left side of FIG. 14B. On a right side of FIG. 14B, an image 161 according to the image data $D_1$ that is thus written in the memory region $Y_1$ is indicated as an image. The image data $D_1$ is written in the memory region $Y_1$ as the image 161 having the same image as the image 160 at the time of input.

Figure 14C:
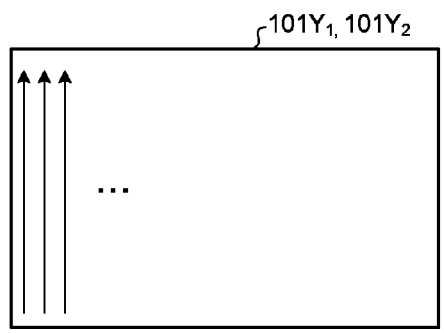
FIG. 14C is a diagram for explaining the access control of the memory of the first embodiment.

The image cutting unit 100 reads the image data $D_1$ written in the memory region $Y_1$ at timing $RD_1$ at the same time as start of the vertical synchronization signal VD that follows the vertical synchronization signal VD with which the image data $D_1$ is written (timing $RD_1$ in the chart 213), as indicated in FIG. 14C.

At this time, the image cutting unit 100 reads the image data $D_1$ pixel by pixel from a pixel at a lower left corner of the image as a read start pixel, in the vertical direction sequentially over lines. When a pixel at an upper end of the image has been read, subsequently, each pixel is read in the vertical direction from a pixel next on the right to a pixel at the read start pixel in the vertical direction as a read start pixel. This operation is repeated until read of a pixel at an upper right corner of the image is completed.

In other words, the image cutting unit 100 performs read of the image data $D_1$ from the memory region $Y_1$ by sequentially reading each pixel for each line in the vertical direction from a left end to a right end of the image, regarding the line direction of the image that is the vertical direction from the lower end toward the upper end.

Figure 15A:
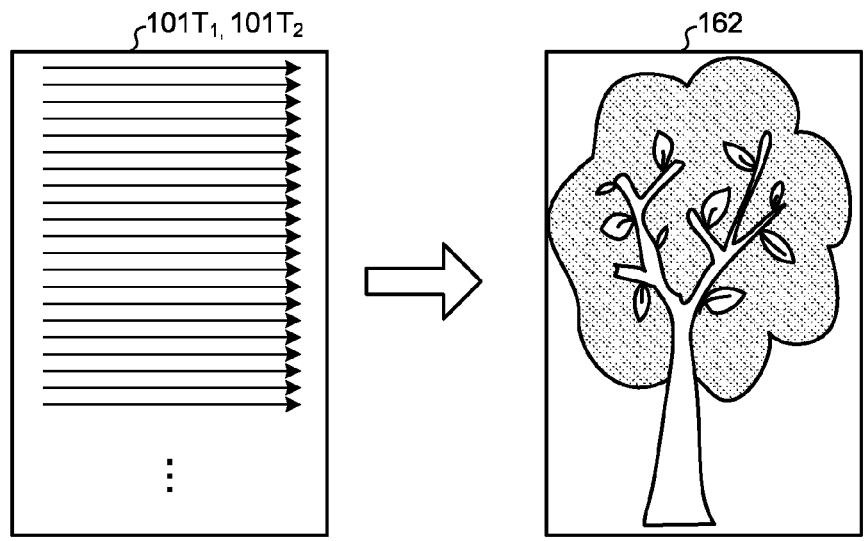
FIG. 15A is a diagram for explaining the access control of the memory of the first embodiment.

The image cutting unit 100 sequentially writes pixels of the image data $D_1$ thus read from the memory region $Y_1$ pixel by pixel toward the line direction into the memory region $T_1$ as indicated on a left side of FIG. 15A (timing $WD_1$ in the chart 214). That is, for example, each time the image cutting unit 100 reads one pixel from the memory region $Y_1$, the image cutting unit 100 writes this read one pixel in the memory region $T_1$.

On a right side of FIG. 15A, an image 162 according to the image data $D_1$ thus written in the memory region $T_1$ is indicated. The image data $D_1$ is written in the memory region $T_1$ as the size of horizontal 1080 pixels×vertical 1920 pixels (lines), to be the image 162 that is an image obtained by rotating the image 160 at the time of input by 90° in a clockwise direction so that the horizontal direction and the vertical direction thereof are switched.

The image cutting unit 100 specifies, to the memory region $T_1$, an address of a cut-out region that is specified by the image control unit 103, and reads image data of the region that is specified as the cut-out region from the memory region $T_1$. As indicated as timing $RD_1$ in the chart 214, this read timing is delayed by the two vertical synchronization signals VD from timing at which the image data $D_1$ is input to the image cutting unit 100.

The projector apparatus 1 according to the first embodiment, as described above, shifts a projection position of a projection image by changing the projection angle θ of the projection lens 12 by rotating the drum unit 10, and specifies a read-out position of the image data according to the projection angle θ. For example, the image data $D_1$ is input to the image cutting unit 100 at timing of the projection angle $θ_1$. The projection angle θ at timing at which an image according to this image data $D_1$ is actually projected can be changed from the projection angle $θ_1$ to the projection angle $θ_3$ that differs from the projection angle $θ_1$.

Therefore, a cut-out region at the time of reading the image data $D_1$ from the memory region $T_1$ is read in a region larger than that of
image data corresponding to a projected image, expecting this change in the projection angle θ.

Figure 15B:
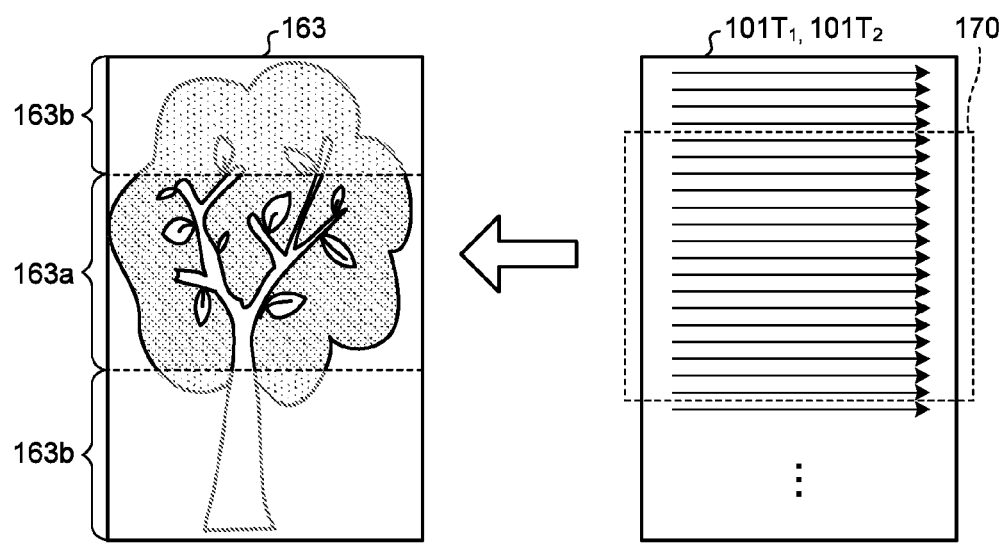
FIG. 15B is a diagram for explaining the access control of the memory of the first embodiment.

More specific explanation is given using FIG. 15B. On a left side of FIG. 15B, an image 163 according to the image data $D_1$ that is stored in the memory region $T_1$ is indicated. In this image 163, a region that is actually projected is referred to as a projection region 163a, and another region 163b is a non-projected region. In this case, the image control unit 103 specifies a cut-out region 170 that is larger than the region of image data that corresponds to the image of the projection region 163a by at least an amount corresponding to several lines that correspond to an amount of change when the projection angle θ of the projection lens 12 changes at the maximum in a period of the two vertical synchronization signals VD.

The image cutting unit 100 reads image data from this cut-out region 170 at timing of the vertical synchronization signal VD that follows the vertical synchronization signal VD with which the image data $D_1$ is written in the memory region $T_1$. Thus, the image data to be projected is read from the memory region $T_1$ at timing of the projection angle $θ_3$ to be provided to the display device 114 through the image processing unit 102 at the subsequent stage, and is projected from the projection lens 12.

To the image cutting unit 100, image data $D_2$ is input at timing of the vertical synchronization signal VD that follows the vertical synchronization signal VD with which the image data $D_1$ is input. At this timing, in the memory region $Y_1$, the image data $D_1$ is written. Therefore, the image cutting unit 100 writes the image data $D_2$ in the memory region $Y_2$ (timing $WD_2$ in the chart 215). The sequence of writing the image data $D_2$ at this time is the same as the sequence of writing the image data $D_1$ into the memory region $Y_1$ described above, and an image is also the same (refer to FIG. 14B).

That is, the image cutting unit 100 reads the image data $D_2$ pixel by pixel from a pixel at a lower left corner of the image as a read start pixel, in the vertical direction sequentially over lines up to a pixel at the upper end of the image. Subsequently, each pixel is read in the vertical direction from a pixel next on the right to the read start pixel in the vertical direction as a read start pixel (timing $RD_2$ in the chart 215). This operation is repeated until read of a pixel at an upper right corner of the image is completed. The image cutting unit 100 writes pixels of the image data $D_2$ thus read from the memory region $Y_2$ pixel by pixel toward the line direction into the memory region $T_2$ (timing $WD_2$ in the chart 216) (refer to the left side in FIG. 15A).

The image cutting unit 100 specifies, to the memory region $T_2$, an address of a cut-out region that is specified by the image control unit 103, and reads image data of the region that is specified as the cut-out region from the memory region $T_2$ at the timing $RD_2$ in the chart 216. As described above, the image cutting unit 100 specifies, to the memory region $T_2$, a region that is larger than a region of image data corresponding to an image to be projected as a cut-out region 170, expecting a change in the projection angle θ (refer to the right side in FIG. 5B).

The image cutting unit 100 reads image data from this cut-out region 170 at timing of the vertical synchronization signal VD that follows the vertical synchronization signal VD with which the image data $D_2$ is written in the memory region $T_2$. Thus, the image data of the cut-out region 170 in the image data $D_2$ input to the image cutting unit 100 at the timing of the projection angle $θ_2$ is read from the memory region $T_2$ at timing of the projection angle $θ_4$ to be provided to the display device 114 through the image processing unit 102 at the subsequent stage, and is projected from the projection lens 12.

Hereinafter, in a similar manner, the image data $D_3$, $D_4$, $D_5$, . . . are sequentially processed alternately using a set of the memory regions $Y_1$ and $T_1$, and a set of the memory regions $Y_2$ and $T_2$.

As described above, in the first embodiment, the memory regions $Y_1$ and $Y_2$ that are used to write and read image data in the size of horizontal 1920 pixels×vertical 1080 pixels (lines), and the memory regions $T_1$, and $T_2$ that are used to write and read image data in the size of horizontal 1080 pixels×vertical 1920 pixels (lines) are arranged respectively. This is because generally, to a dynamic random access memory (DRAM) that is used as image memory, the access speed of the vertical direction is slower than the access speed of the horizontal direction. When a memory with easy random access with which equivalent access speed can be achieved in both the horizontal direction and the vertical direction is used, it can be configured to use two memories having a capacity according to image data.

Flow of Processing to Perform Projection of Image Data

Figure 16:
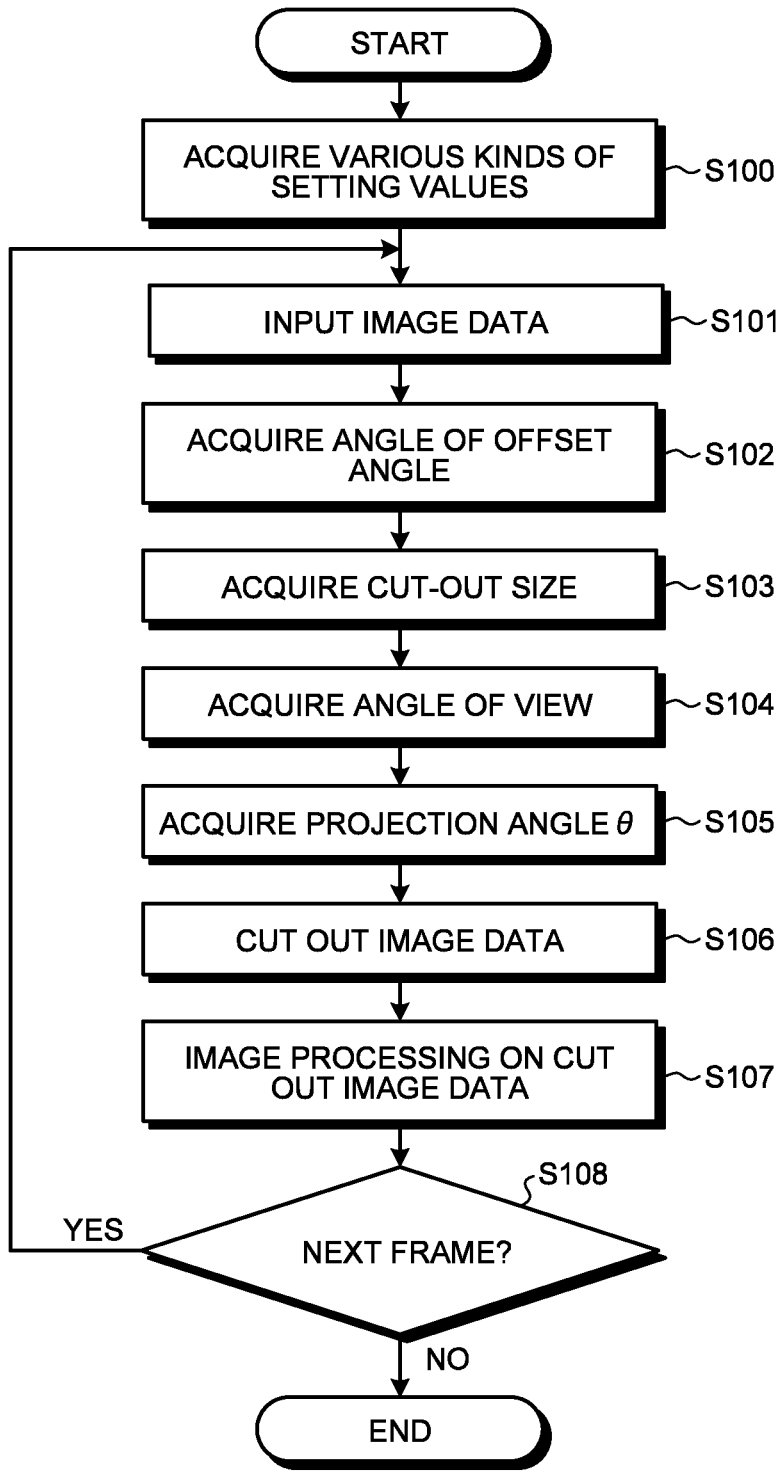
FIG. 16 is a flowchart indicating one example of a flow of processing when an image according to image data is projected in the projector apparatus according to the first embodiment.

Next, a flow of processing at the time of projecting an image according to image data in the projector apparatus 1 is explained using a flowchart of FIG. 16.

At step S100, with input of image data, various kinds of setting values according to projection of an image of the image data are input to the projector apparatus 1. The input various kinds of setting values are acquired by, for example, the CPU 120. The various kinds of setting values acquired at this point include a value that indicates whether to rotate the image of the image data, that is, whether to switch the horizontal direction and the vertical direction of the image, a magnification of the image, and the offset angle $θ_{ofst}$ at the time of projection. The various kinds of setting values may be input to the projector apparatus 1 as data with input of image data to the projector apparatus 1, or may be input by operating the operating unit 14.

At following step S101, image data of one frame is input to the projector apparatus 1, and the input image data is acquired by the image cutting unit 100. The acquired image data is written in the memory 101.

At following step S102, the image control unit 103 acquires the offset angle $θ_{ofst}$. At following step S103, the image control unit 103 acquires the cut-out size, that is, the size of a cut-out region in the input image data. The image control unit 103 may acquire the size of the cut-out region from the setting values acquired at step S100, or may acquire according to operation to the operating unit 14. At following step S104, the image control unit 103 acquires the angle of view α of the projection lens 12, for example, from the angle-of-view control unit 106. Furthermore, at following step S105, the image control unit 103 acquires the projection angle θ of the projection lens 12, for example, from the rotation control unit 104.

At following step S106, the image control unit 103 acquires a cut-out region for the input image data based on the offset angle $\theta_{ofst}$, the size of the cut-out region, the angle of view α, and the projection angle θ acquired at step S102 to step S105, using Equation (3) to Equation (8). The image control unit 103 instructs, to the image cutting unit 100, read of the image data from the acquired cut-out region. The image cutting unit 100 executes read of image data in the cut-out region from the image data stored in the memory 101, and cutting out of the image data, following the instruction from the image control unit 103. The image cutting unit 100 provides the image data of the cut-out region that is read from the memory 101 to the image processing unit 102.

At step S107, the image processing unit 102 performs the size conversion processing on the image data provided from the image cutting unit 100, for example, based on Equation (1) and Equation (2) described above. The image data subjected to the size conversion processing by the image processing unit 102 is provided to the display device 114. The display device 114 modulates light from the light source 111 according to the image data and emits the light. This emitted light is projected from the projection lens 12.

At following step S108, the CPU 120 it is determined whether there is input of image data of a next frame following the image data input at step S101 described above. When it is determined that there is input of image data of a next frame, the CPU 120 returns to the processing at step S101, and performs the processing at step S101 to step S107 described above on the image data of the next frame. That is, this processing at step S101 to step S107 is repeated in a unit of frame of image data, for example, according to the vertical synchronization signal 124 of the image data. Therefore, the projector apparatus 1 can perform each processing based on a change of the projection angle θ in a frame unit.

On the other hand, at step S108, when it is determined that image data of a next frame is not input, the CPU 120 stops the image projection operation of the projector apparatus 1. For example, the CPU 120 controls to turn off the light source 111, and instructs the rotating mechanism 105 to bring the orientation of the drum unit 10 back to the initial orientation. The CPU 120 then stops a fan to cool the light source 111 and the like after the orientation of the drum unit 10 returns to the initial orientation.

As described above, according to the projector apparatus 1, image projection in which a position of a projected subject image in an image according to input image data is easy to be grasped by a user can be performed while maintaining the resolution of the image data.

Improvement in Quality of Projection Image (1)

Next, a first method of improving quality of a projection image according to the first embodiment is explained. According to the control of the projector apparatus 1 described above, a cut-out region to cut out projection image data for projection from image data that is stored in the memory 101 is varied according to the projection angle θ. Therefore, as exemplified in FIG. 17A, FIG. 17B, and FIG. 17C, by shifting a projection image projected on a projection medium in input image data 2000 according to the projection angle θ, an entire region of the input image data 2000 can be projected.

Figure 17A:
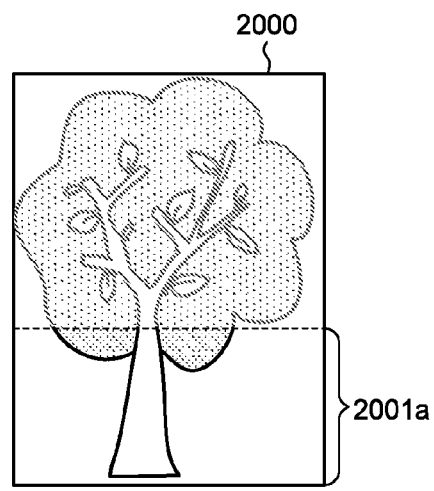
FIG. 17A is a diagram for explaining projection of an entire region of input image data while shifting according to the projection angle θ according to the first embodiment.
Figure 17B:
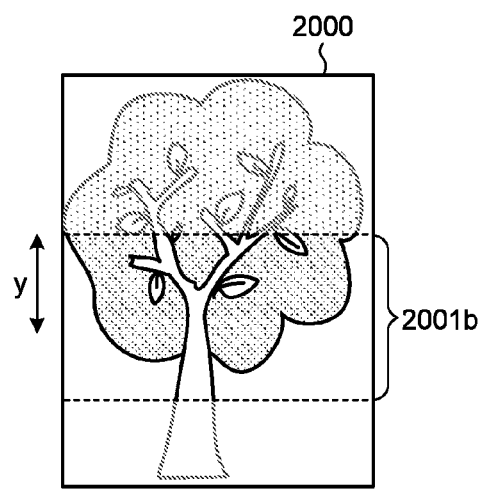
FIG. 17B is a diagram for explaining projection of an entire region of input image data while shifting according to the projection angle θ according to the first embodiment.
Figure 17C:
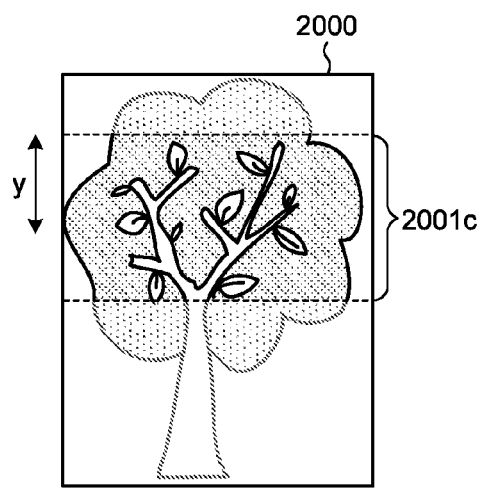
FIG. 17C is a diagram for explaining projection of an entire region of input image data while shifting according to the projection angle θ according to the first embodiment.

Specifically, as indicated in FIG. 17A, for example, in a state of the projection angle 0°, a cut-out region 2001a including a lower end of the input image data 2000 is specified to the memory 101, and image data inside the cut-out region 2001a is read as projection image data to be projected. When the projection angle θ is increased, as indicated in FIG. 17B, a cut-out region 2001b that is shifted from the cut-out region 2001a by height y corresponding to increase of the projection angle θ is specified to the memory 101, and image data in the cut-out region 2001b is read as projection image data. When the projection angle θ is further increased, in a similar manner, as indicated in FIG. 17C, projection image data is read from a cut-out region 2001c that is specified to the memory 101, shifting from the cut-out region 2001b by the height y corresponding to increase of the projection angle θ, to be projected.

As described above, read of image data according to a cut-out region specified in the memory 101 is performed in synchronization of the vertical synchronization signal 124, and display by the display device 114 is updated at each timing of the vertical synchronization signal 124. A case in which the projection angle θ changes at some high speed is explained with reference to FIG. 18A, FIG. 18B, and FIG. 18C.

Suppose that at the beginning, for example in a state of the projection angle 0°, image data in the cut-out region 2001a that is specified to the memory 101 is read as projection image data based on the vertical synchronization signal 124. If the projection angle θ is changed from this state, a projection position on the projection medium is shifted by height $z_1$ corresponding to an amount of change $\Delta\theta_1$ of the projection angle θ after time $t_1$ has passed. This is indicated in FIG. 18B.

Figure 18A:
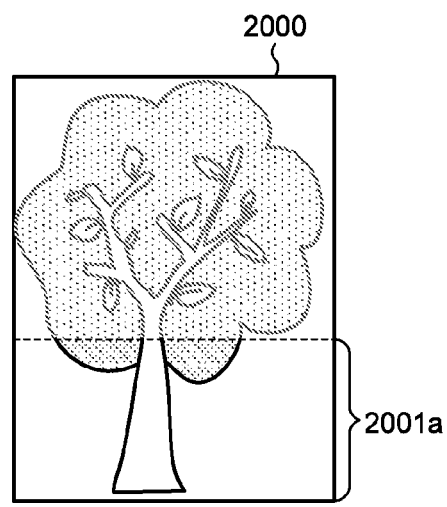
FIG. 18A is a diagram for explaining a projection image when the projection angle θ changes at some high speed according to the first embodiment.
Figure 18B:
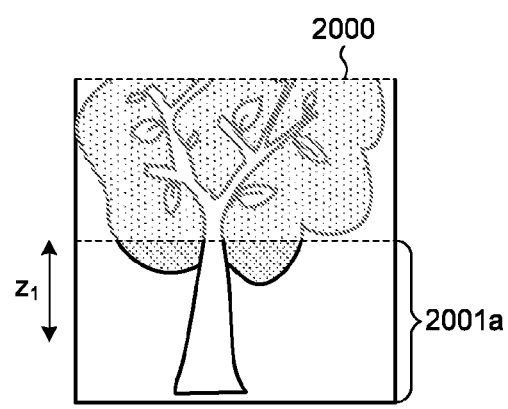
FIG. 18B is a diagram for explaining the projection image when the projection angle θ changes at some high speed according to the first embodiment.

In a state indicated in FIG. 18B, when the time $t_1$ is shorter than a frame cycle, change of the cut-out region 2001a to the memory 101 and update of display by the display device 114 are not performed, and only the projection direction of the projection lens 12 changes. Therefore, the projection image is an image obtained by shifting the projection image data that is read from the cut-out region 2001a at the time of the projection angle being 0°, by the height $z_1$ corresponding to an amount of change $\Delta\theta_1$ of the projection angle θ. For example, when the cut-out region 2001a that is specified at the time of the projection angle θ of 0° includes a lower end portion of the input image data 2000, the projection image including this lower end portion is to be projected as it is, lifted by the height $z_1$ of the projection angle θ.

Subsequently, suppose that the projection angle θ is kept being changed further for time $t_2$ from the state indicated in FIG. 18B, and one frame cycle has passed from the state indicated in FIG. 18A. At this time, the projection position by the projection lens 12 is shifted further by height $z_2$ from the position indicated in FIG. 18B according to an amount of change $\Delta\theta_2$ of the projection angle θ. In this case, as indicated in FIG. 18C, a cut-out region to cut the projection image data is changed to the cut-out region 2001c that is shifted from the cut-out region 2001a specified at the time point of FIG. 18A by an amount of increase ($\Delta\theta_1+\Delta\theta_2$) of the projection angle θ.

Figure 18C:
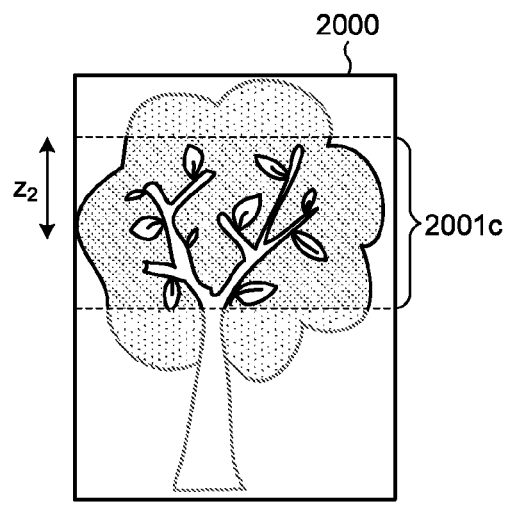
FIG. 18C is a diagram for explaining the projection image when the projection angle θ changes at some high speed according to the first embodiment.

The states indicated in FIG. 18A, FIG. 18B, and FIG. 18C are compared. When it is considered that a virtual projection image when an image of the entire input image data 2000 is assumed to be projected (referred to as virtual projection image), in the state indicated in FIG. 18B, the projection position of the virtual projection image is lifted according to the change of the projection angle θ. On the other hand, in the state indicated in FIG. 18C, the cut-out region is shifted according to the change of the projection angle θ in the input image data 2000 (the cut-out region 2001*c*), and the projection position of the virtual projection image is not changed relative to the state of the FIG. 18A.

Accordingly, when the projection image is changed from the state of FIG. 18B to the state of FIG. 18C, the projection position of the virtual projection image returns to the initial projection position, that is, the projection position of FIG. 18A. Therefore, if this operation is repeated, the projection image looks vibrating upward and downward in a frame cycle to a user.

Such a phenomenon that the projection image looks vibrating upward and downward is eased as the speed of change of the projection angle θ is reduced. However, even if change in the projection angle θ is made at a slow speed, vibration originated in errors based on the resolving power for a change of the projection angle θ according to the driving pulse 122 to drive the motor 40 still remains. In view of a fact that the ability of a human eye to detect a minute movement is higher than the ability to detect a large movement, even if this vibration originated in the errors is as small as a few lines, there is a possibility to be recognized as a blur of an image by a user.

Therefore, in the first method of improving quality of a projection image according to the first embodiment, by limiting the resolving power for change of the projection angle θ, the blur being recognized by a user as described above is suppressed. More specifically, based on the angle of view α of the projection lens 12, and the size in a pixel unit of an effective region of the display device 114, the resolving power for the projection angle θ by the driving pulse 122 to drive the motor 40 is specified.

Figure 19:
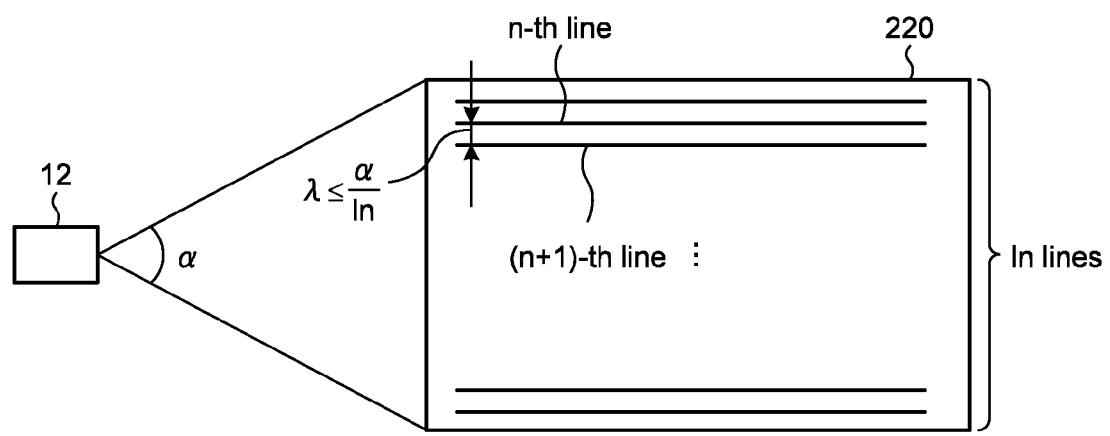
FIG. 19 is a schematic diagram indicating a state in which a projection image is projected from a projection lens according to the first embodiment.

More specific explanation is given using FIG. 19. FIG. 19 schematically indicates a state in which a projection image 220 is projected from the projection lens 12. In FIG. 19, the projection lens 12 projects the projection image 220 at the angle of view α.

When the size of the maximum effective region in the vertical direction of the display device 114 is the number of lines ln, an angle per line at the angle of view α of the projection lens 12 is expressed as an angle (α/ln). In the example indicated in FIG. 19, an angle at which an n-th line and an (n+1)-th line are viewed from the center of the projection lens 12 is the angle (α/ln).

On the other hand, the motor 40 performs rotation for a predetermined angle (a step angle) by a pulse of the driving pulse 122. Moreover, as described above, the rotation of the motor 40 is transmitted to the gear 35 through the worm gear 41 and the gear group including the gears 42*a*, 42*b*, and the gear 43 that transmits rotation of the worm gear 41, thereby rotating the drum 30. Accordingly, the drum 30 also rotates by a predetermined angle λ with a single pulse of the driving pulse 122 for the motor 40, and the projection direction of the projection lens 12 changes by the angle λ. Therefore, the angle λ indicates the resolving power for change of the projection angle θ in the rotation control of the motor 40. In other words, the angle λ is the minimum variable angle of the projection angle θ in the rotation control of the motor 40. This angle λ is a value that is determined based on the step angle of the motor 40, and a gear ratio of the gear group including the gear 35.

In the first method of improving quality of a projection image, relation between the angle (α/ln) and the angle λ described above is defined as Equation (10) below. The angle λ is an angle exceeding 0°.

$$\lambda \leq \alpha/\ln \quad (10)$$

According to Equation (10), a shift amount of a projection image for each of the driving pulse 122 for the motor 40 is one line or less. Therefore, a blur of a projection image recognized by a user when the projection angle θ of the projection lens 12 is successively changed as described above can be suppressed, and improvement of quality of the projection image to high quality is enabled.

As described above, the optical system of the projector apparatus 1 includes an optical zoom mechanism, and the size of a projection image can be enlarged or reduced by changing the angle of view α by an optical zoom. In the optical zoom, a projection image becomes smallest when the angle of view α is an angle of a lower limit (minimum angle of view $\alpha_{MIN}$) in the optical system, and it is preferable because an angle per line of the angle of view of the projection lens 12 also becomes the minimum angle.

Accordingly, when the angle λ is determined as an angle satisfying above Equation (10) when the angle of view α is the minimum angle of view $\alpha_{MIN}$, change of the projection angle θ per pulse of the driving pulse 122 is always within an angle corresponding to one line when the angle of view α is changed by the optical zoom. Therefore, up-and-down vibrations of the projection image can be effectively suppressed, and the blur of the projection image recognized by a user as described above can be suppressed.

Improvement in Quality of Projection Image (2)

Next, a second method of improving quality of a projection image according to the first embodiment is explained. As described above, in the projector apparatus 1 according to the first embodiment, read of projection image data from the memory 101, and update of display of the display device 114 are performed at each of the vertical synchronization signal VD, that is, in a frame cycle.

On the other hand, in the projector apparatus 1, for example, when the projection angle θ is changed at a high speed, it is necessary to provide a plurality of driving pulses to the motor 40 within a frame cycle. In this case, without updating a projection image, only the projection angle θ, that is, the projection position changes stepwise in one frame cycle. Therefore, when the projection image is updated at the head of a next frame, projection images at projection positions that have changed stepwise in the previous frame are observed by a user as an afterglow.

Figure 20:
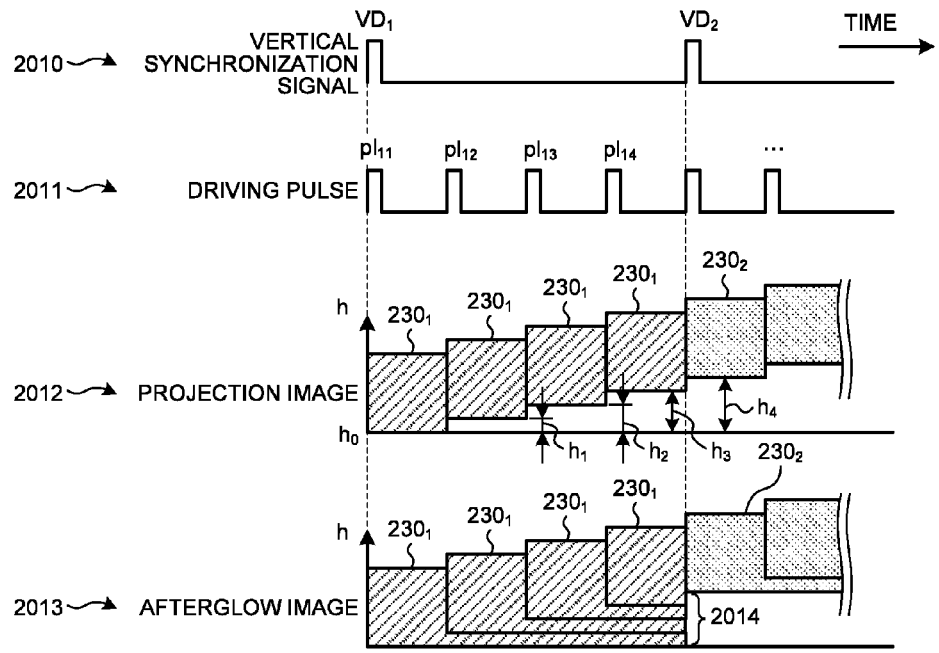
FIG. 20 is a time chart for schematically explaining an afterglow phenomenon.

This afterglow phenomenon is schematically explained using a time chart of FIG. 20. In the following, unless otherwise specified, explanation is given referring to the driving pulse 122 as a driving pulse $pl_x$. In FIG. 20, a chart 2010 indicates the vertical synchronization signal VD. A projection image is supposed to be updated, for example, at timing of a rising edge of the vertical synchronization signal VD. A chart 2011 indicates the driving pulse of the motor 40. In this example, in one frame cycle, pulses are given four times to the motor 40 with driving pulses $pl_{11}$, $pl_{12}$, $pl_{13}$, and $pl_{14}$ having a predetermined pulse width, at uniform time intervals between pulses of the respective driving pulses $pl_{11}$ to $pl_{14}$. More specifically, the rotation control unit 104 (refer to FIG. 4) generates and gives the driving pulse $pl_{11}$ at the timing of a vertical synchronization signal $VD_1$, to the motor 40, and thereafter, generates the driving pulses $pl_{12}$, $pl_{13}$, . . . sequentially at regular intervals, that is, at regular time intervals, to give to the motor 40.

A chart 2012 schematically indicates a state in which a projection image is projected on a projection medium, and an axis in the vertical direction in the figure indicates a height of a projection position h. The projection position is indicated with respect to a lower end of the projection image. A projection image $230_1$ that is updated at the timing of the first vertical synchronization signal VD1 is kept being projected at a same position $h_0$ until the next driving pulse $pl_{12}$, and the projection angle θ is changed at the driving pulse $pl_{12}$ and the projection position is shifted to a next position $h_1$. Thereafter, in a similar manner, the projection position of the projection image $230_1$ is shifted from the position h1 to a position $h_2$ at the next driving pulse $pl_{13}$, and is further shifted to a position h3 at a next driving pulse $pl_{14}$.

At the timing of a next vertical synchronization signal $VD_2$, a driving pulse at the head of a following frame cycle is generated. Therefore, the projection image $230_1$ is updated to a projection image $230_2$ and the projection position thereof is shifted to a position $h_4$.

A chart 2013 is a diagram schematically indicating an afterglow image of a projection image. An axis in the vertical direction in the figure indicates a height of the projection position h, similarly to the chart 2012. As indicated in the chart 2012, the projection position of the projection image $230_1$ is sequentially shifted as the position $h_0, h_1, \ldots$, at each driving pulse. Furthermore, at the timing of the vertical synchronization signal $VD_2$ the projection image $230_1$ is updated to the projection image $230_2$, and the projection position thereof is shifted to the position $h_4$ by the driving pulse. Therefore, there is a possibility that an afterglow of the projection image $230_1$ is observed by a user at each of the positions $h_0$ to $h_3$ at a portion 2014 at which the projection image $230_1$ before update at the vertical synchronization signal $VD_2$ at each of the positions $h_0$ to $h_3$ does not overlap with the projection image $230_2$.

In this case, the time intervals between pulses of the respective driving pulses $pl_{11}, pl_{12}, \ldots$ are uniform, and the projection image $230_1$ at each of the positions $h_0$ to $h_3$ are observed by a user to approximately the same extent. Therefore, the intensity of the afterglow images caused by the projection image $230_1$ at the respective positions $h_0$ to $h_3$ are substantially equal to each other, and the afterglow can be observed as a smeared image.

Therefore, in the second method of improving quality of a projection image according to the first embodiment, when driving pulses are generated in a frame cycle, it is arranged so that at least a part among a time interval between the timing at which the projection image is updated and a driving pulse adjacent to the timing, and time intervals between driving pulses adjacent to each other is nonuniform. Thus, when a projection position is changed by a driving pulse in one frame cycle, a projection image at a specific projection position is projected for longer time than the projection image at other positions, and the projection image at the specific position is observed by a user for a longer time. Therefore, the intensity of an afterglow of the projection image at each of the projection positions becomes nonuniform, and smear of an image caused by the afterglow is suppressed.

Figure 21:
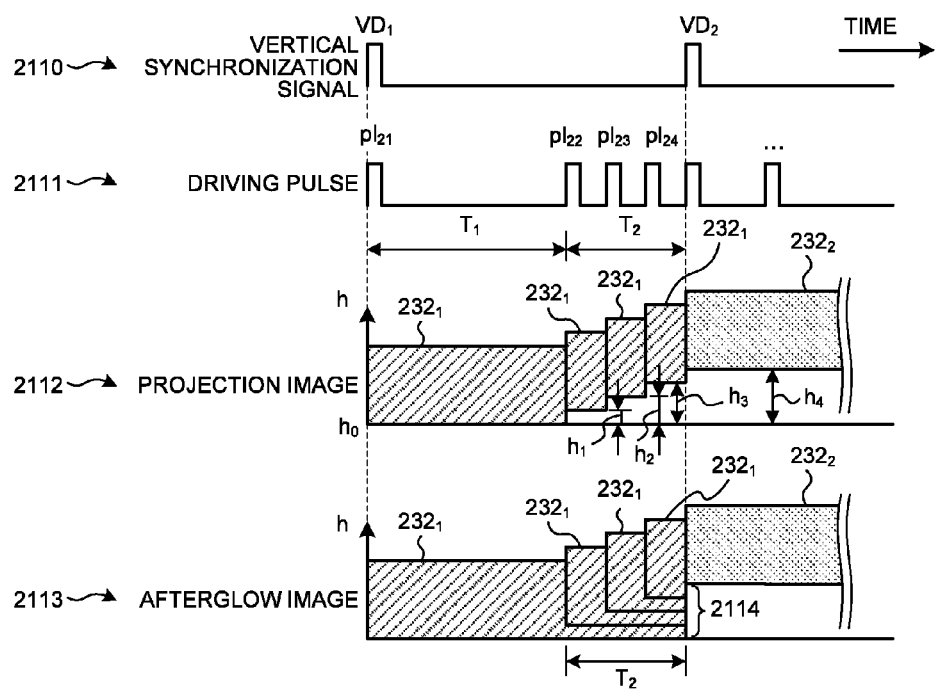
FIG. 21 is a time chart indicating one example of motor control by a second method of improving quality of a projection image according to the first embodiment.

FIG. 21 is a time chart indicating one example of motor control by the second method of improving quality of a projection image. In FIG. 21, a chart 2110 indicates the vertical synchronization signal VD, a chart 2111 indicates a driving pulse, a chart 2112 indicates a projection image, and a chart 2113 indicates an afterglow image. The example of FIG. 21 is an example in which, four driving pulses $pl_{21}$, $pl_{22}$, $pl_{23}$, and $pl_{24}$ are generated as indicated in the chart 2111 in one frame cycle at ½ intervals compared to a case in which four driving pulses are generated at uniform intervals in one frame cycle. More specifically, the rotation control unit 104 generates the first driving pulse $pl_{21}$ at the timing of the vertical synchronization signal $VD_1$. The other driving pulses $pl_{22}$, $pl_{23}$, and $pl_{24}$ are generated in a latter half of a frame cycle of the vertical synchronization signal $VD_1$ at ½ intervals compared to a case in which four driving pulses are generated at uniform intervals in one frame cycle.

In this case, as indicated in the chart 2112, a projection image $232_1$ is updated at the timing of the vertical synchronization signal $VD_1$, and the projection image $232_1$ is projected at the position $h_0$ at the driving pulse $pl_{21}$ of the timing. The projection image $232_1$ is kept being projected at the position $h_0$ during time $T_1$ until the following driving pulse $pl_{22}$. The projection position is shifted from the position $h_0$ to $h_1$ at the driving pulse $pl_{22}$, and during time $T_2$ from the driving pulse $pl_{22}$, the projection position is shifted sequentially from the position $h_1$ to the position $h_2$ and the position $h_3$ by the driving pulses $pl_{23}$ and $pl_{24}$. Therefore, the projection image $232_1$ before update at the vertical synchronization signal $VD2_1$ at the respective positions $h_0$ to $h_3$ are observed overlapped with a projection image $232_2$. Moreover, focusing on a portion at which the projection image $232_1$ and the projection image $232_2$ do not overlap with each other, an image at a portion 2114 in the chart 2113 is observed as an afterglow even in a display period of the projection image $232_2$.

In this case, a user observes the projection image $232_1$ at the position $h_0$ for a longer time (time $T_1$) than a total observation time (time $T_2$) of the projection image $232_1$ at each of the positions $h_1$ to $h_3$. Therefore, as an afterglow image, the one at the position $h_0$ is mainly observed, and the ones at the other positions $h_1$ to $h_3$ are scarcely observed. Therefore, smear of an image caused by an afterglow can be further effectively suppressed.

Figure 22:
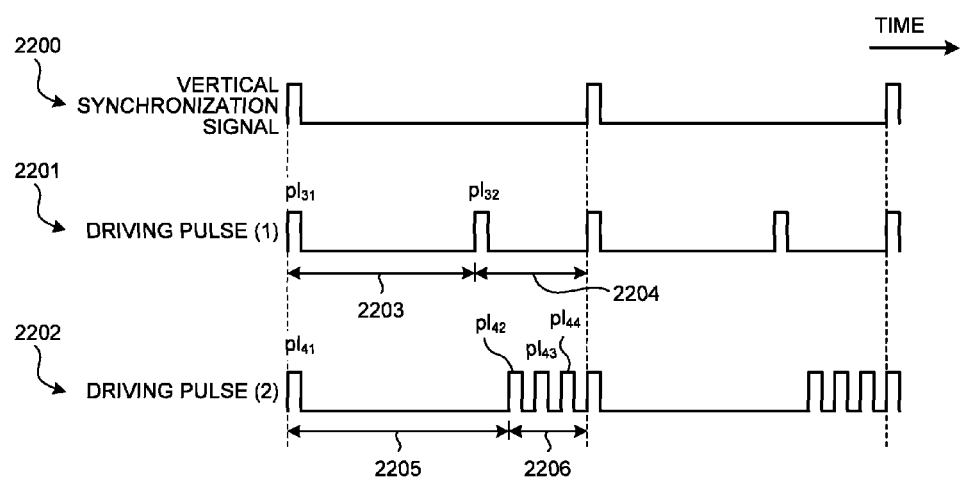
FIG. 22 is a time chart indicating another example of driving pulse by the second method of improving quality of a projection image according to the first embodiment.

FIG. 22 is a time chart indicating another example of a driving pulse by the second method of improving quality of a projection image. In FIG. 22, a chart 2200 indicates the vertical synchronization signal VD. A chart 2201 indicates an example in which two driving pulses $pl_{31}$ and $pl_{32}$ are generated in one frame cycle. In this case, the rotation control unit 104 generates the driving pulses $pl_{31}$ at the timing of the first vertical synchronization signal VD, and generates driving pulses $pl_{32}$ in the one frame cycle. The projection position of the projection image updated at the timing of the first vertical synchronization signal VD is shifted according to the driving pulses $pl_{32}$.

At this time, the rotation control unit 104 generates the driving pulses $pl_{32}$ at timing shifted later from a center of a frame cycle, and makes an interval a from the head of the frame cycle to the driving pulses $pl_{32}$ and an interval b from the driving pulses $pl_{32}$ to the end of the frame cycle nonuniform. Thus, the projection image that is projected at an interval 2203 is observed by a user for a longer time than the projection image that is projected at an interval 2204, smear of an image caused by an afterglow can be suppressed. As described, when at least two driving pulses are generated in one frame cycle, the second method of improving quality of a projection image can be applied.

A chart 2202 is an example in which when four driving pulses are generated in one frame cycle as explained using FIG. 21, time intervals among driving pulses $pl_{42}$ to $pl_{44}$ other than a driving pulse $pl_{41}$ at the timing of the vertical synchronization signal VD are further shortened (interval 2206). That is, a ratio of time in one frame cycle of an interval 2205 in the chart 2202 is larger than the time $T_1$ indicated in the chart 2111 in FIG. 21. Therefore, compared to the example in FIG. 21, a smear of an image caused by an afterglow can be further effectively suppressed.

Although in the above description, the time intervals among the driving pulses are long in a first half of one frame cycle, this is not limited to this example, and the time intervals among the driving pulses may be long in a latter half of one frame cycle. Moreover, also when one driving pulse is generated in one frame cycle, time intervals between the timing of update of a projection image and a driving pulse may be made nonuniform. More specifically, the driving pulses are arranged in proximity including a match with the time of update of a projection image, not at positions of a ½ frame cycle. This enables to suppress a smear of an image caused by an afterglow.

Setting of Projection Prohibition Period

Although in the above description, it has been explained that a projection image is projected throughout one frame cycle, this is not limited to this example, a projection prohibition period in which projection of a projection image is prohibited can be set according to timing of a driving pulse in one frame cycle. The projection prohibition period is set in a time interval between the timing at which the projection image is updated and a driving pulse adjacent to the timing, or in a period except a period having the largest time interval among time intervals between driving pulses adjacent to each other.

Figure 23:
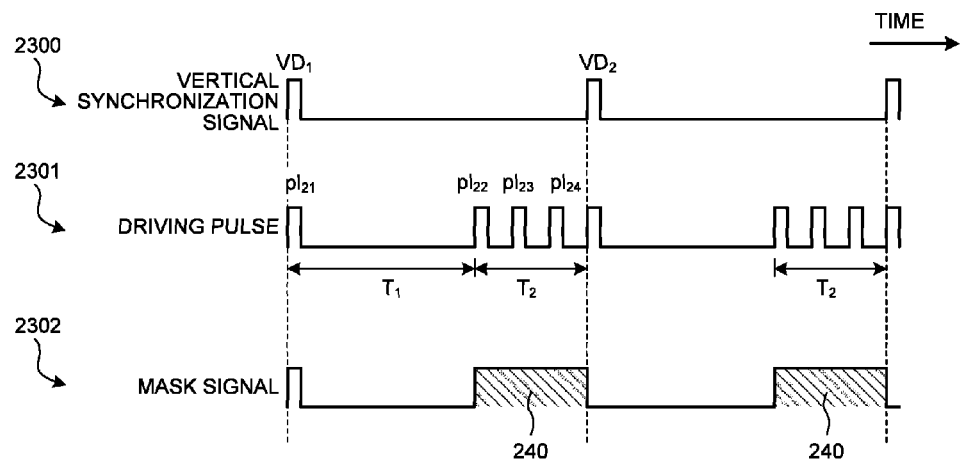
FIG. 23 is a time chart for specifically explaining about a projection prohibited period according to the first embodiment.

This projection prohibition period is further specifically explained using a time chart of FIG. 23. In FIG. 23, a chart 2300 indicates the vertical synchronization signal VD. A chart 2301 indicates a driving pulse. In this example, similarly to the chart 2111 in FIG. 21, four driving pulses $pl_{21}$, $pl_{22}$, $pl_{23}$, and $pl_{24}$ are generated in one frame cycle at ½ intervals compared to a case in which driving pulses are generated at uniform intervals in one frame cycle.

In the example of the chart 2301, in a frame cycle of the vertical synchronization signal $VD_1$, a time interval (time $T_1$) between the driving pulses $pl_{21}$, $pl_{22}$ is the period having the largest time interval between adjacent pulses in the frame cycle. Therefore, except this period, a period from the driving pulse $pl_{22}$ to the rear end of the frame (time $T_2$) is set as the projection prohibition period. This projection prohibition period can specified, for example, by using a mask signal as exemplified in the chart 2302. In the example of the chart 2302, a mask signal is specifies the projection prohibition period with a mask period 240 in a High state.

Figure 24:
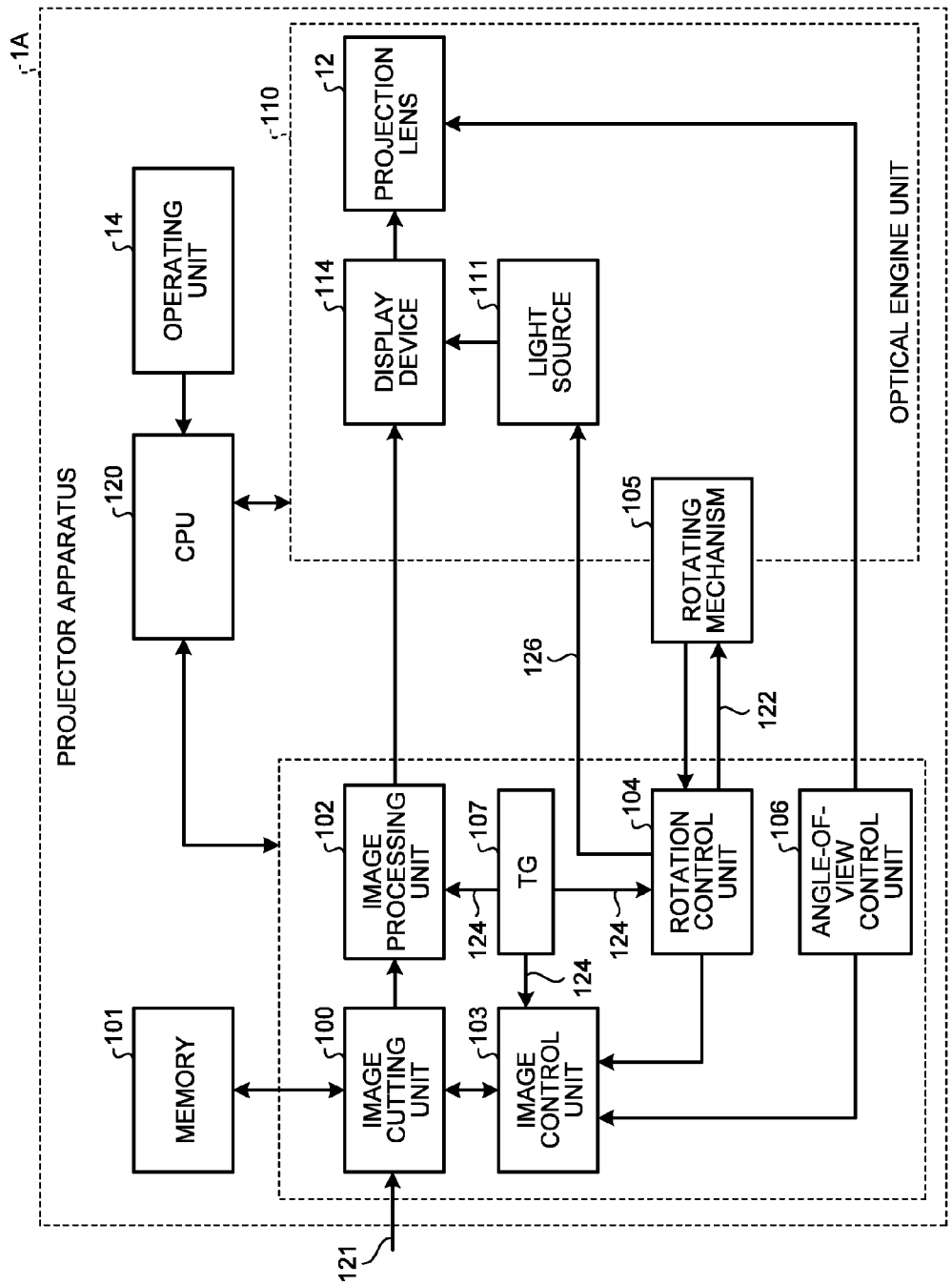
FIG. 24 is a block diagram indicating a configuration of one example of a projector apparatus that prohibits projection by controlling illumination of a light source according to the first embodiment.

As the method of prohibiting projection of a projection image in the projection prohibition period, various methods are conceivable. FIG. 24 indicates a configuration of one example of a projector apparatus 1A in which projection is prohibited in the projection prohibition period by controlling lighting of the light source 111. In FIG. 24, and FIG. 25, FIG. 26, and FIG. 27 described later, like reference symbols are given to components common with those in FIG. 4, and detailed explanation thereof is omitted.

As indicated in FIG. 24, the rotation control unit 104 generates the driving pulse 122 based on the vertical synchronization signal 124 that is provided from the timing generator 107, to provide to the rotating mechanism 105. Along with that, the rotation control unit 104 generates a mask signal 126 based on the generated driving pulse 122, to provide to the light source 111. The light source 111 is controlled to be turned off during the mask period 240 of the mask signal 126, and to be turned on during a period other than the mask period 240.

Figure 25:
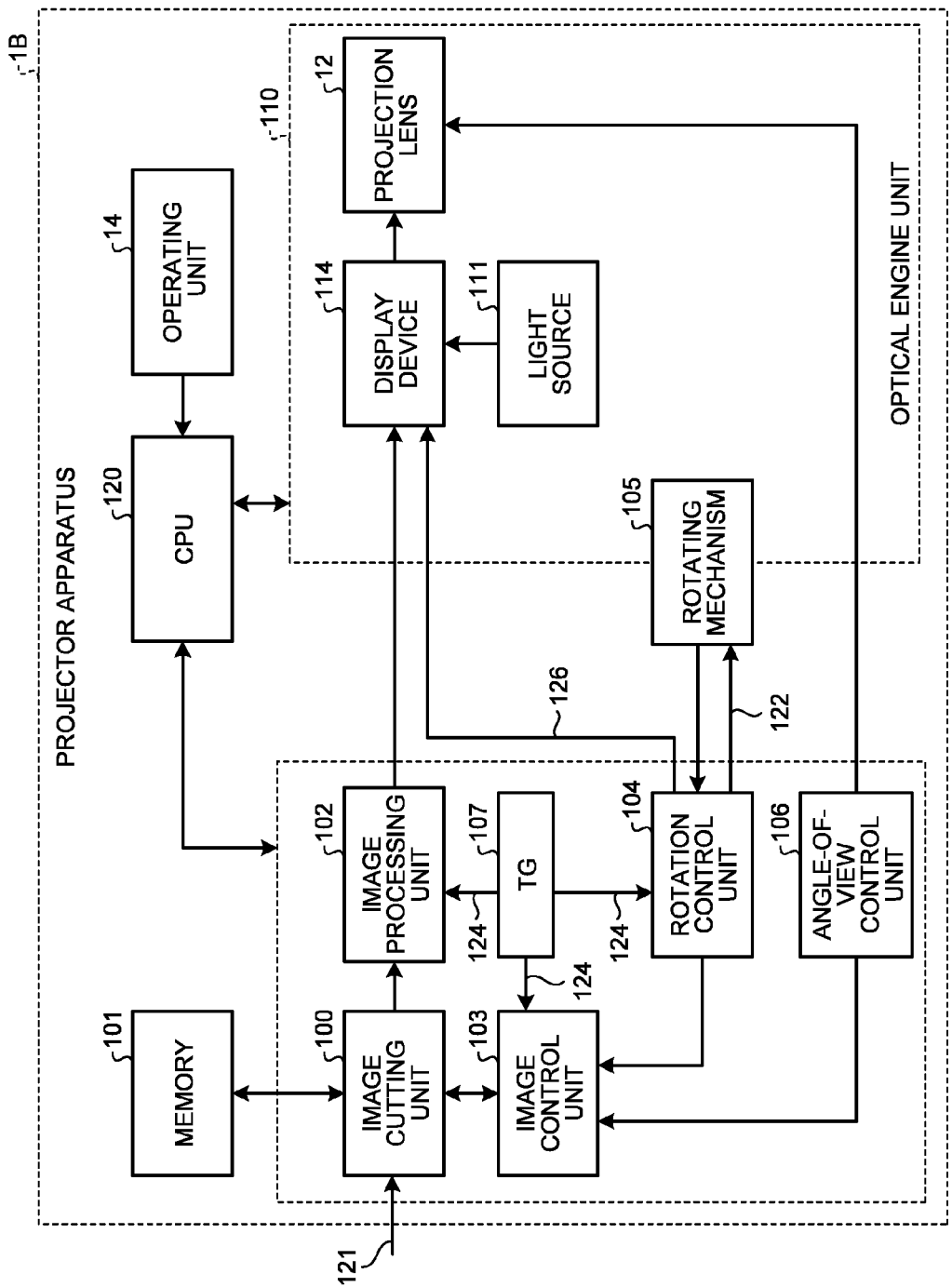
FIG. 25 is a block diagram indicating a configuration of one example of a projector apparatus that prohibits projection by switching on/off of drive of a display device according to the first embodiment.

FIG. 25 indicates a configuration of one example of a projector apparatus 1B in which projection is prohibited in the projection prohibition period by switching on/off of driving of the display device 114. The rotation control unit 104 provides the mask signal 126 that is generated according to the driving pulse to a not illustrated driving circuit that drives the display device 114. The driving circuit drives the display device 114, for example, such that all pixels are forcibly displayed in black during the mask period 240 of the mask signal 126, and drives the display device 114 according to image data provided by the image processing unit 102 during period other than the mask period 240.

Figure 26:
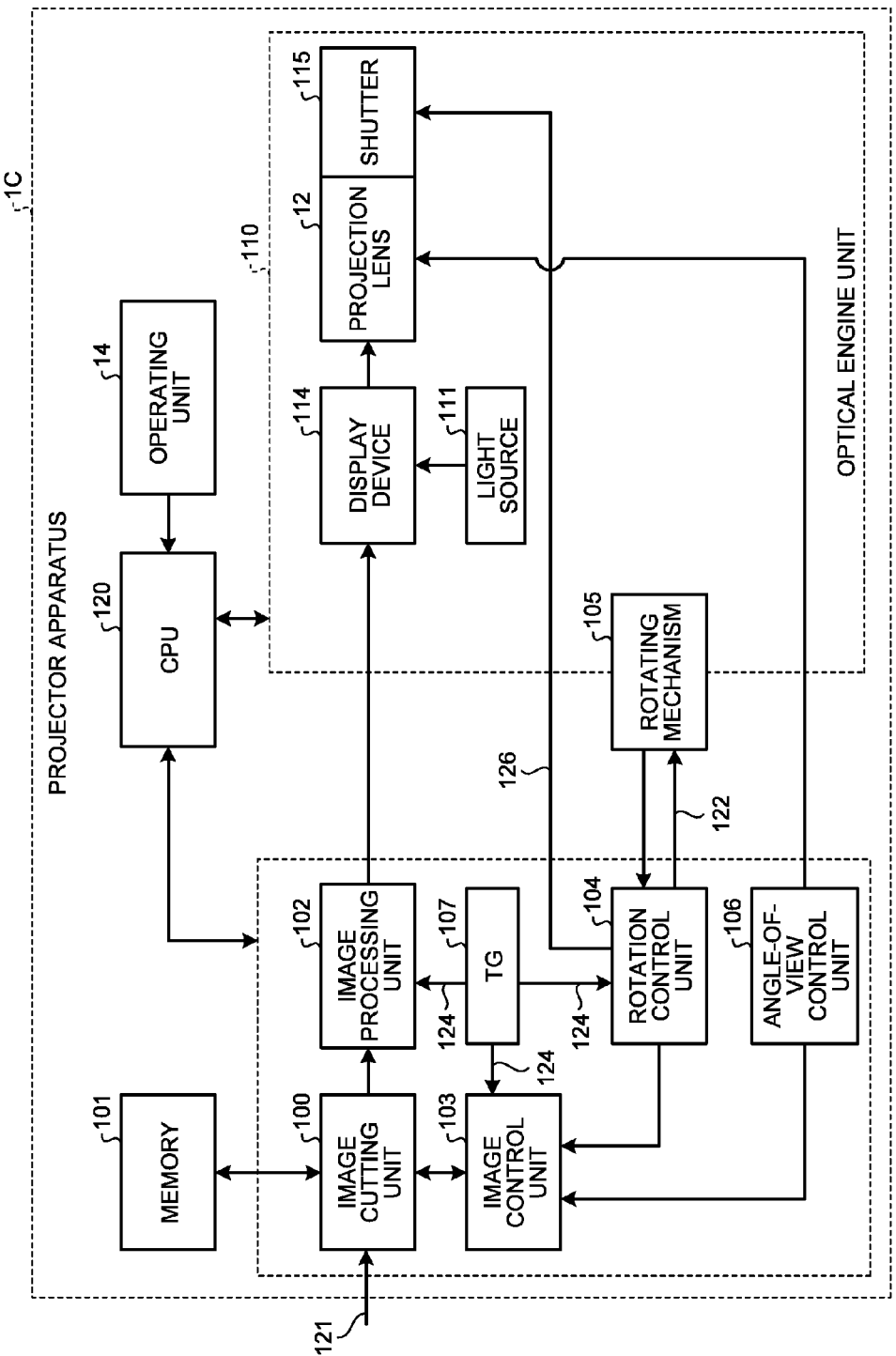
FIG. 26 is a block diagram indicating a configuration of one example of a projector apparatus that prohibits projection by switching open/close of a shutter according to the first embodiment.

FIG. 26 indicates a configuration of one example of a projector apparatus 1C in which projection is prohibited during the projection prohibition period by arranging a shutter 115 for the projection lens 12, and by switching open/close of the shutter 115. The shutter 115 shuts light that is emitted from the projection lens 12 in a closed state, thereby prohibiting projection. As the shutter 115, a mechanical shutter that mechanically shuts light may be used, or a method of shutting light by controlling transmittance or a transmission direction of light such as a liquid crystal shutter may be used.

The rotation control unit 104 provides the mask signal 126 that is generated according to the driving pulse to a not illustrated shutter driving unit that drives the shutter 115. The shutter driving unit, for example, drives the shutter 115 so as to be in a closed state during the mask period 240 of the mask signal 126, and to be in an open state during a period other than the mask period 240.

The shutter 115 is not limited to an example of arranging in the projection lens 12. For example, the shutter 115 may be arranged between the light source 111 and the display device 114.

Figure 27:
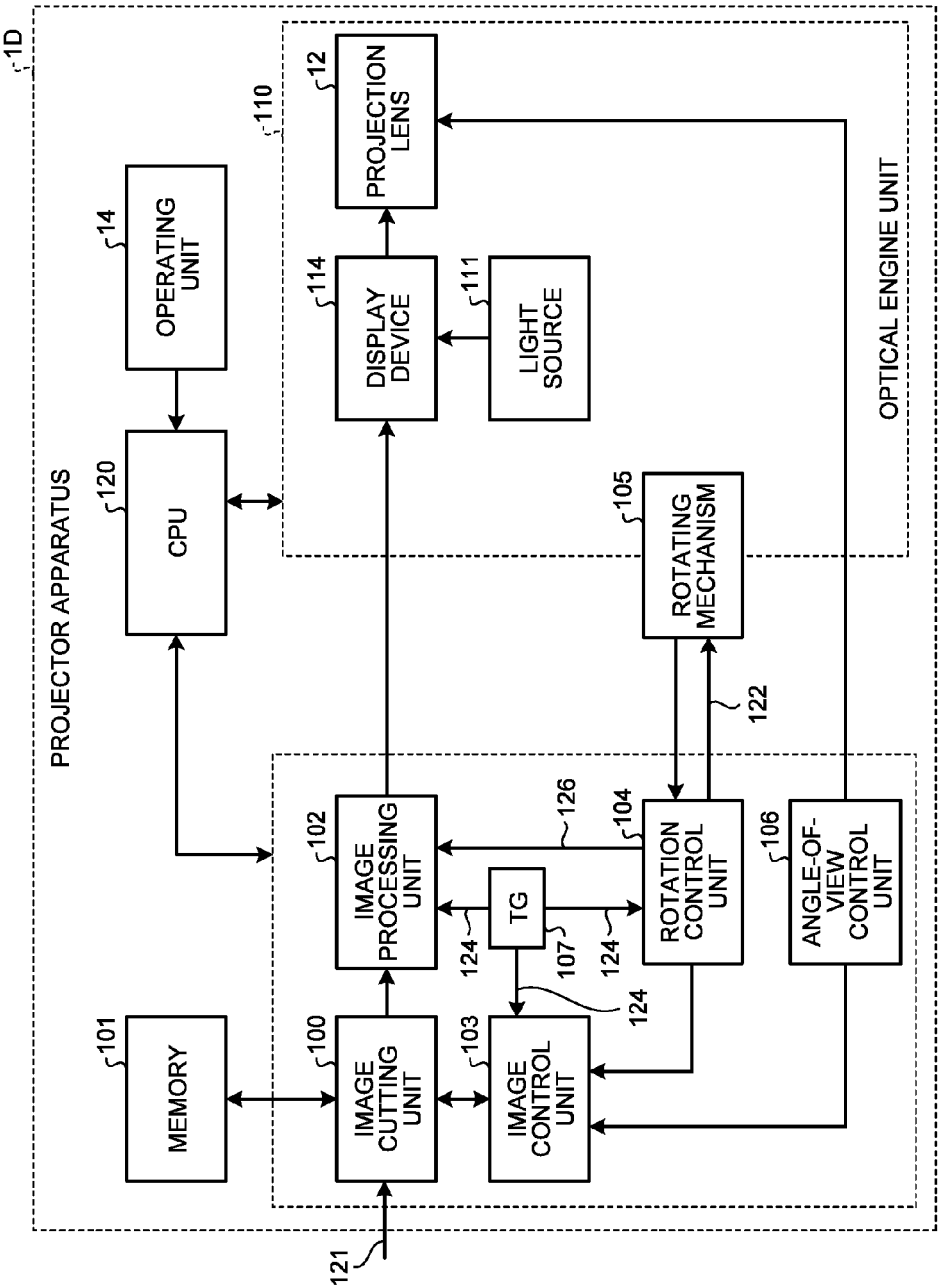
FIG. 27 is a block diagram indicating a configuration of one example of a projector apparatus that prohibits projection by inserting a black image according to the first embodiment.

FIG. 27 indicates a configuration of one example of a projector apparatus 1D in which projection is prohibited during the projection prohibition period by inserting a black image in which an entire effective region is in black by the image processing unit 102. The rotation control unit 104 provides the mask signal 126 that is generated according to the driving pulse to the image processing unit 102.

The image processing unit 102 generates black image data to display the black image at the start point of the mask period 240 of the mask signal 126, and replaces the generated black image data with image data that is provided by the image cutting unit 100, to provide to the driving circuit of the display device 114. The black image data may generated in advance and stored in a not illustrated memory. Although illustration is omitted, the mask signal 126 is also provided to the driving circuit of the display device 114, and the driving circuit updates display of the display device 114 at the start point of the mask period 240 to perform display of the black image data.

As described above, in one frame cycle, by prohibiting projection in a time interval between timing at which a projection image is updated and a driving pulse adjacent to the timing, or in a period except a period having the largest time interval between driving pulses adjacent to each other, projection of a projection image at a position that differs from that of a projection image projected from the head of the frame being a cause of an afterglow is prohibited in one frame cycle, for example, thereby preventing occurrence of an afterglow.

The effect of reducing occurrence of an afterglow can be obtained even when the projection prohibition period is a part of a time interval between the timing at which a projection image is updated and a driving pulse adjacent to the timing, or a part of a period except a period having the largest time interval between driving pulses adjacent to each other. Moreover, to compensate reduction in brightness caused by having the projection prohibition period, for example, control to increase a light amount in a projection period may further added for the light source 111.

Combination of First Method and Second Method of Improving Quality of Projection Image The first method and the second method of improving quality of a projection image described above can be used in combination. For example, the step angle of the motor 40 and the gear ratio of the gear group including the gear 35 are determined so that change in the projection direction of the projection lens 12 at each of the driving pulses $pl_{22}$, $pl_{22}$, $pl_{23}$, and $pl_{24}$ indicated in the chart 2111 in FIG. 21 explained in the second method is to be the angle λ that is determined according to Equation (10) described above.

Second Embodiment

Next, a second embodiment is explained. Although in the first embodiment described above, the drum unit 10 rotates in the vertical direction, and a projection region is changed according to a projection angle of the projection lens 12 in the vertical direction, this is not limited to this example. In the second embodiment, a projection region of the projection lens 12 is changeable in the horizontal direction.

Figure 28:
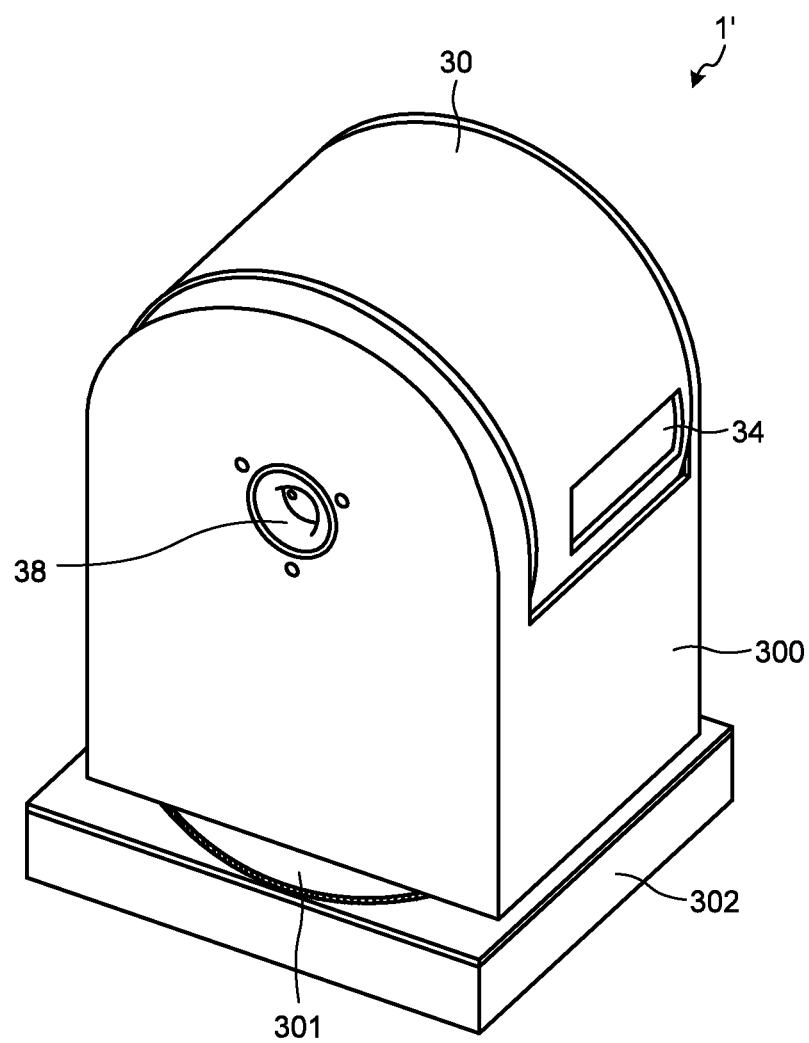
FIG. 28 is a diagram illustrating an example of an external view of a projector apparatus according to a second embodiment.

FIG. 28 indicates an example of an external view of an image projection apparatus (projector apparatus) 1' according to the second embodiment. FIG. 28 indicates the image projection apparatus 1' from which a cover and the like are removed, and like reference symbols are given to components common with those in FIG. 1 and FIG. 2, and detailed explanation thereof is omitted.

In the projector apparatus 1', a horizontal rotation casing 300 is attached to a turn table 301 that is arranged on a mount 302. The horizontal rotation casing 300 is attached in such a manner that the drum 30 that includes the projection lens 12 thereinside is rotatable in the vertical direction about an axis unit 38 as a center. According to rotation of the turn table 301, the horizontal rotation casing 300 rotates in the horizontal direction, and along with that, the projection direction of the projection lens 12 changes in the horizontal direction.

Figure 29:
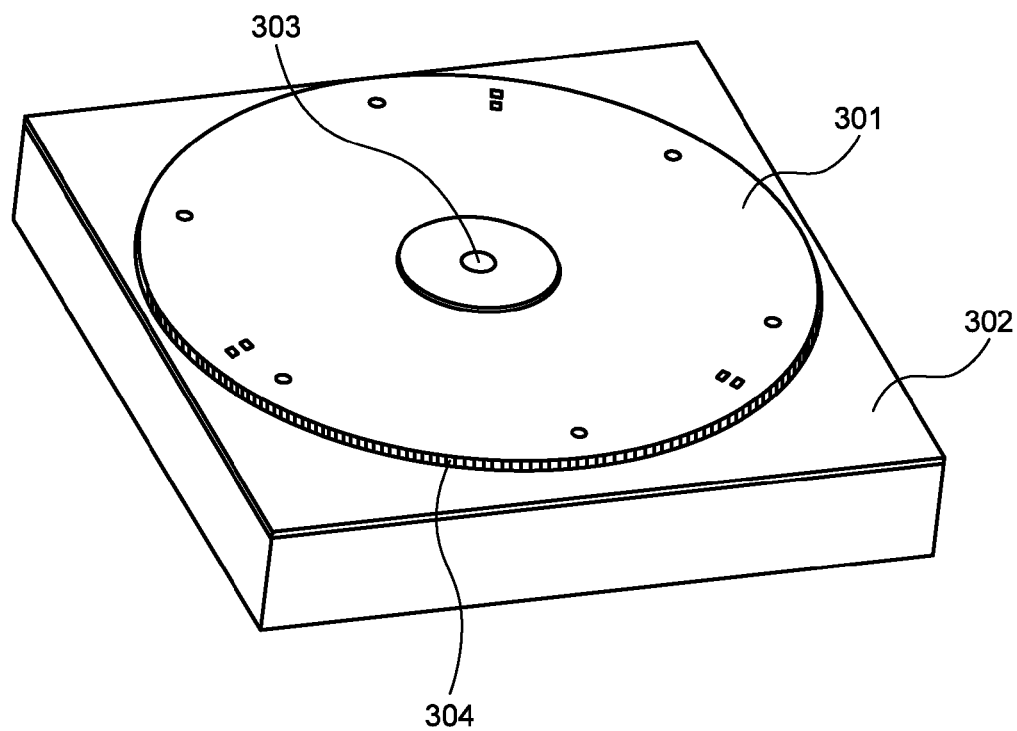
FIG. 29 is a diagram indicating an example of an external view of a mount of the projector apparatus according to the second embodiment.

FIG. 29 indicates an example of an external view of the mount 302. The mount 302 has the turn table 301. To the turn table 301, a gear 304 is attached on the rear surface thereof. The turn table 301 rotates in the horizontal direction about an axis 303 as a center, by rotation that is transmitted from a driving unit 313 described later through the gear 304. Moreover, in the mount 302, various kinds of boards of a circuit unit, a power source unit, and the like are arranged thereinside.

Figure 30:
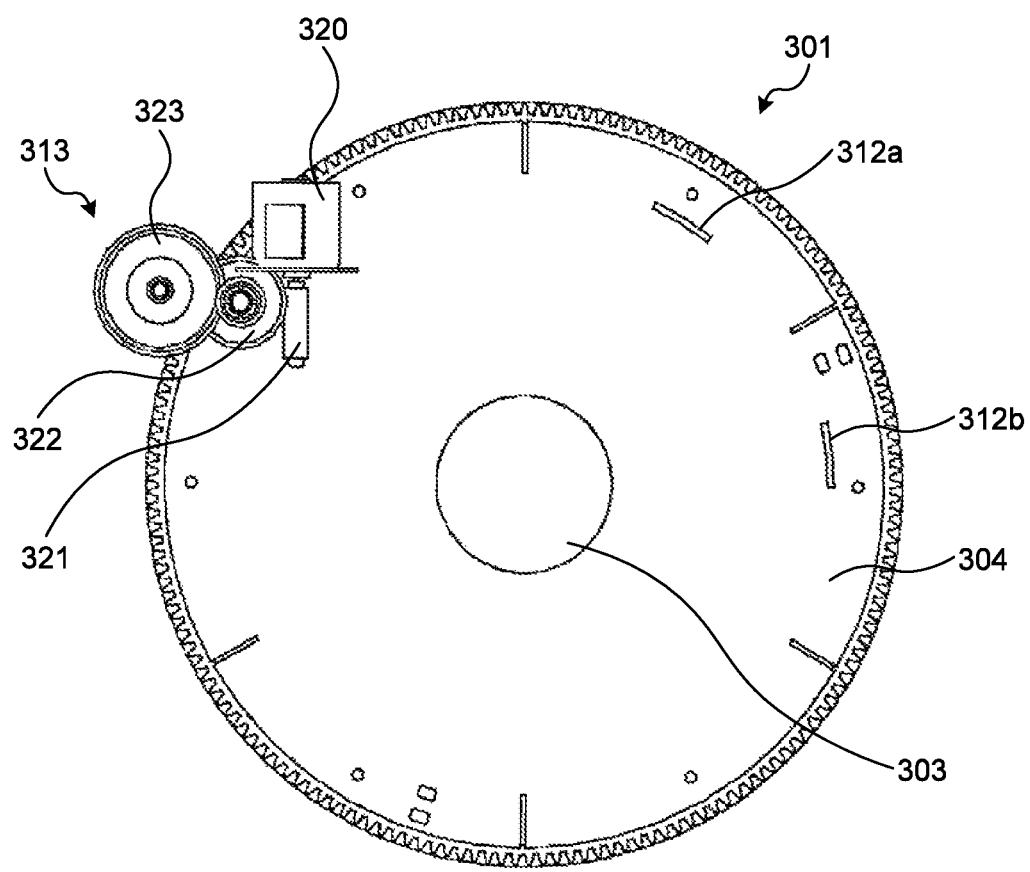
FIG. 30 is a view of a turn table of the projector apparatus according to the second embodiment from a rear surface side.

FIG. 30 is a view of the turn table 301 from a rear surface side. The driving unit 313 transmits rotation to the gear 304, to rotate the turn table 301. More specifically, the driving unit 313 has, for example, a motor 320 that is a stepping motor, and has a gear group that includes a worm gear 321 that is directly driven by a rotation axis of the motor 320, a gear 322 that transmits rotation by the worm gear 321, and a gear 323 that transmits rotation transmitted from the gear 322 to the gear 304 of the turn table 301. By transmitting rotation of the motor 320 to the gear 304 by this gear group, it is possible to rotate the turn table 301 according to rotation of the motor 320. The rotation speed of the turn table 301 is determined based on the rotation speed of the motor 320 and the gear ratio of the gear group.

In the turn table 301, protrusions 312a and 312b are arranged. By detecting these protrusions 312a and 312b by using a not illustrated photointerrupter and the like, the direction of the turn table 301 relative to the reference direction can be obtained.

In the following, when the projection direction of the projection lens 12 is perpendicular to a first surface, it is determined that the projection angle of the projection lens 12 in the horizontal direction is the projection angle 0°, and this projection angle 0° is regarded as an initial value. The projection angle of the projection lens 12 increases in a clockwise direction when viewed from an upper surface side of the turn table 301.

The configuration for controlling operation of the projector apparatus 1' and the configuration of an optical system including the projection lens 12 are common with the circuit unit and the optical engine unit 110 indicated in FIG. 4, and therefore, explanation thereof is omitted. In the second embodiment, the rotating mechanism 105 indicated in FIG. 4 includes the driving unit 313, the protrusions 312a and 312b, and the not illustrated photointerrupter explained using FIG. 30. Output of the photointerrupter is provided to the rotation control unit 104 indicated in FIG. 4. Furthermore, the motor 320 of the driving unit 313 is driven by the driving pulse provided by the rotation control unit 104 indicated in FIG. 4.

Operation of the projector apparatus 1' according to the second embodiment is schematically explained referring to the configuration indicated in FIG. 4. In the following, explanation is given assuming that the drum 30 does not rotate in the vertical direction.

Figure 31A:
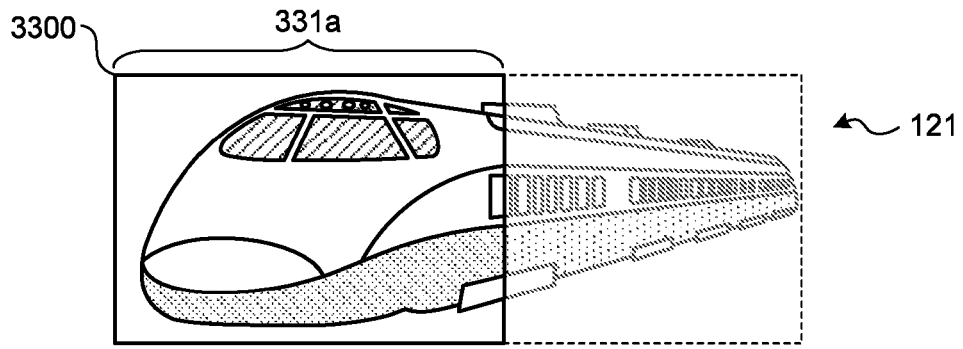
FIG. 31A is a schematic diagram of an example of a relation between input image data and projection image data according to the second embodiment.
Figure 31B:
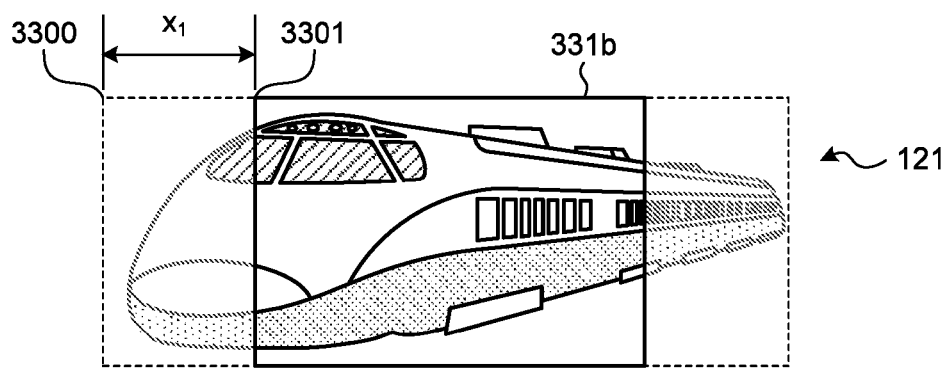
FIG. 31B is a schematic diagram of an example of a relation between input image data and projection image data according to the second embodiment.
Figure 31C:
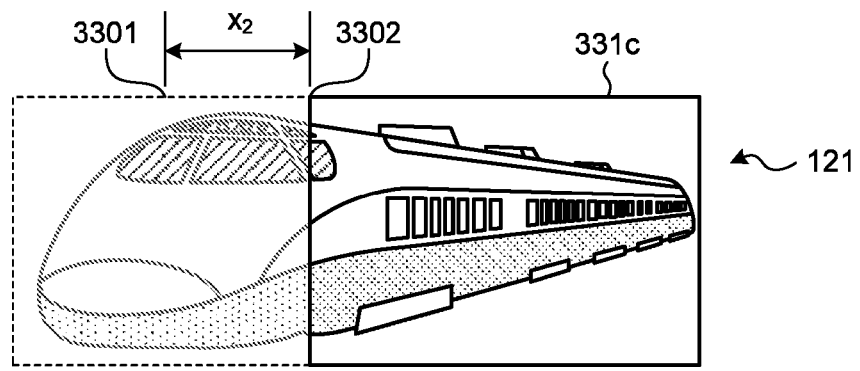
FIG. 31C is a schematic diagram of an example of a relation between input image data and projection image data according to the second embodiment.

For example, image data that has been shaped into predetermined image size is input to the projector apparatus 1' as the input image data 121. In this example, the image size of the input image data is larger in width than the width of the display device 114. This input image data is stored in the memory 101 through the image cutting unit 100. FIG. 31A, FIG. 31B, and FIG. 31C schematically indicate examples of relation between the input image data 121 that is stored in the memory 101 and projection image data 331a, 331b, and 331c that are cut out from the input image data 121 by the image cutting unit 100 in accordance with instruction of the image control unit 103.

At the projection angle 0°, the image control unit 103 specifies, to the image cutting unit 100, a cut-out region of the input image data 121 that is stored in the memory 101 according to information of the projection angle θ acquired from the rotation control unit 104. For example, at the projection angle 0°, the image control unit 103 specifies, to the image cutting unit 100, the image region 331a having the width according to the effective region of the display device 114 from a position 3300 at a left end of the input image data 121 as a cut-out region.

The image cutting unit 100 cuts out the image region 331a that is specified as the cut-out region from the input image data 121 stored in the memory 101, to output as image data. This image data is provided to the driving circuit that drives the display device 114 through the image processing unit 102. The driving circuit drives the display device 114 according to the provided image data. Thus, a projection image of the image region 331a is projected on a projection medium such as a wall and a screen.

For example, when change of the projection angle θ is instructed by operation made by a user to the operating unit 14, the rotation control unit 104 generates the driving pulse 122 to drive the motor 320 in accordance with a command from the CPU 120 according to this instruction, to provide to the rotating mechanism 105. At the rotating mechanism 105, the motor 320 is driven by the provided driving pulse 122, and the turn table 301 is rotated by an angle corresponding to the driving pulse 122.

The driving pulse 122 is also provided to the image control unit 103 from the rotation control unit 104. The image control unit 103 specifies a cut-out region to the input image data 121 stored in the memory 101 according to the driving pulse 122. In this example, the image control unit 103 specifies the image region 331*b* having a left end at a position 3301 that is shifted in the horizontal direction by $x_1$ pixels from the image region 331*a*, corresponding to change in the projection angle θ according to the driving pulse.

The image cutting unit 100 cuts out the image region 331*b* from the input image data 121 stored in the memory 101, to output as image data. This image data is provided to the driving circuit of the display device 114 through the image processing unit 102, and the display device 114 is driven. Thus, a projection image of the image region 331*b* is projected on the projection surface at a position shifted by an amount corresponding to the change of the projection angle θ relative to the position of the projection image of the image region 331*a*.

When further change of the projection angle θ is instructed, in a similar manner, the turn table 301 is rotated by an angle corresponding to the driving pulse by control of the rotation control unit 104, to change the projection angle θ. Along with that, the image region 331*c* having a left end at a position 3302 that is further shifted in the horizontal direction by $x_2$ pixels from the image region 331*b* is specified as a cut-out region, corresponding to the change of the projection angle θ. A projection image based on image data of this image region 331*c* is projected on the projection medium.

As described above, according to the projector apparatus 1' of the second embodiment, the input image data 121 having width larger than the width of the display device 114 can be projected entirely, shifting a predetermined region in the input image data 121 in the horizontal direction.

Application of Method of Improving Quality of Projection Image (1)

The first method of improving quality of a projection image in the first embodiment described above can be applied to the second embodiment. In this case, a cut-out region to cut a projection image is shifted in the horizontal direction in the input image data 121 according to rotation of the turn table 301. Therefore, when the projection angle θ of the projection lens 12 is successively changed, a blur caused by errors based on the resolving power for the projection angle θ as described above is recognized by a user. Accordingly, by applying the first method of improving quality of a projection image described above to the second embodiment, a blur in a projection image in the horizontal direction recognized by a user is suppressed.

In this example, the angle of view α in Equation (10) described above is an angle in which the effective region is viewed in the horizontal direction from the projection lens 12 when an image of the maximum effective region in the horizontal direction is projected in the display device 114.

Moreover, the number of lines ln in Equation (10) is the size of the effective region in the horizontal direction of the display device 114. That is, in the second embodiment, a pixel line constituted of pixels positions in the vertical direction of which correspond thereto in each pixel line in the horizontal direction in the effective region of the display device 114 is defined as a line, and the number of lines in the maximum effective region in the horizontal direction in the display device 114 is the number of lines ln.

Furthermore, the angle λ in Equation (10) is an angle in which the projection direction of the projection lens 12 changes in the horizontal direction by one driving pulse for the motor 320. In other words, the angle λ is the minimum variable angle of the projection angle θ in the rotation control of the motor 320. As described above, the angle λ is a value that is determined based on the step angle of the motor 320 and the gear ratio of the gear group including the gear 304.

When the angle of view α thus defined, the number of lines ln, and the angle λ satisfy Equation (10) described above, a shift amount of a projection image for each driving pulse for the motor 320 is less than one line. Therefore, a blur in the projection image recognized by a user when the projection angle θ of the projection lens 12 is successively changed can be suppressed, and thereby improving the quality of the projection image.

Application of Method of Improving Quality of Projection Image (2)

The second method of improving quality of a projection image in the first embodiment described above can be applied to the second embodiment. Also when the projection direction of the projection lens 12 is changed in the horizontal direction, in a similar manner as the first embodiment, when a driving pulse is provided to the motor 320 in a frame cycle, update of a projection image is not performed and only the projection position gradually changes in one frame cycle. Therefore, when update of the projection image is performed at the head of a next frame, projection images at respective projection positions that have been changed stepwise in the previous frame are observed by a user as an afterglow in the horizontal direction.

In the second embodiment as well, in a similar manner as the first embodiment, when generating driving pulses in a frame cycle, at least a part of a time interval between timing at which a projection image is updated and a driving pulse adjacent to the timing and time intervals between driving pulses adjacent to each other is made nonuniform, thereby intensities of afterglows of projection images at the respective projection positions become nonuniform, and a smear of an image caused by afterglows can be suppressed.

Moreover, at that time, similarly to the first embodiment, a projection prohibition period in which projection of a projection image is prohibited according to timing of the driving pulse can be set in a time interval between timing at which the projection image is updated and a driving pulse adjacent to the timing, or in a period except a period having the largest time interval between driving pulses adjacent to each other in one frame cycle. Thus, for example, in one frame cycle, projection of a projection image at a position different from that of the projection image projected from the head of the frame is prohibited, and occurrence of an afterglow is prevented.

As the method of prohibiting projection of a projection image in the projection prohibition period, any of the method by controlling lighting of the light source 111, the method by switching on/off of driving of the display device 114, the method by using the shutter 115, and the method by inserting a black image can be applied as explained using FIG. 24 to FIG. 27.

Combination of First Method and Second Method of Improving Quality of Projection Image The first method and the second method of improving quality of a projection image can be used in combination in the second embodiment also, similarly to the first embodiment described above. For example, the step angle of the motor 320 and the gear ratio of the gear group including the gear 304 are determined such that change in the projection direction of the projection lens 12 at the respective driving pulses $pl_{21}$, $pl_{22}$, $pl_{23}$, and $pl_{24}$ indicated in the chart 2111 of FIG. 21 explained in the second method is to be the angle λ determined according to Equation (10).

Image Projection Apparatus and Image Projection Method According to Another Aspect of Present Invention An image projection apparatus (projector apparatus) according to another aspect of the present invention includes a projecting unit that modulates light from a light source by a light modulation device based on image data, to project at a predetermined angle of view, a projection-direction changing unit that changes a projection direction of the projecting unit from a first projection direction to a second projection direction by a predetermined angle according to a driving pulse, a projection-angle deriving unit that derives a projection angle between a first projection direction and a projection direction to which the projection-direction changing unit has changed, a storage unit that stores input image data that has been input, an image cutting unit that generates cut-out image data that is obtained by cutting a region of a part of input image data that is stored in the storage unit based on an angle of view and a projection angle at timing of a predetermined cycle as image data projected by the projecting unit, and a generating unit that generates, when the projecting unit projects an image of the input image data that is stored in the storage unit from a first projection direction through a second projection direction, such that an interval between a position of timing at which the cut-out image data is generated and a position of a driving pulse adjacent thereto, and at least a part of intervals between driving pulses adjacent to each other are nonuniform in a predetermined cycle.

In the image projection apparatus according to another aspect of the present invention described above, the generating unit may be configured to generate a longest interval among an interval between the position of timing at which the cut-out image data is generated and intervals between driving pulses adjacent to each other, arranging at a position adjacent to the position of timing at which the cut-out image data is generated in a predetermined cycle.

Furthermore, the generating unit described above may generate two or more driving pulses.

The image projection apparatus according to another aspect of the present invention described above further includes a control unit that controls the projecting unit not to perform projection, and the control unit may control the projecting unit not to perform projection in at least a part of sections except a section having the longest interval among an interval between a position at which cut-out image data is generated and a driving pulse at a position adjacent thereto, and intervals between driving pulses adjacent to each other.

The control unit described above may control to turn off a light source so that projection of light by the projecting unit is not performed.

Furthermore, the control unit described above may control to stop driving based on image data for the light modulation device so that projection of light is not performed by the projecting unit.

The image projection apparatus according to another aspect of the present invention further includes a shutting unit that shuts at least one of light irradiated to the light modulation device and light that is modulated by the light modulation device to be emitted, and the control unit may control the shutting unit to shut light emitted from the projecting unit so that projection of light is not performed by the projecting unit.

The image projection apparatus according to another aspect of the present invention further includes an image processing unit that performs image processing on image data to be projected by the projecting unit, and the control unit may control the image processing unit to insert black image data that displays black into the image data to be projected by the projecting unit so that projection of light is not performed by the projecting unit.

The image projection method according to another aspect of the present invention described above includes a projection-direction changing step of changing a projection direction of a projecting unit that modulates light from a light source based on image data by a light modulation device to project at a predetermined angle of view from a first projection direction to a second projection direction at each predetermined angle according to a driving pulse, a projection-angle deriving step of deriving a projection angle between the first projection direction and a projection direction changed at the projection-direction changing step, a storing step of storing input image data input, an image cutting step of generating, at timing of a predetermined cycle, cut-out image data that is obtained by cutting a region of a part of an image of the input image data that is stored at the storing step based on the angle of view and the projection angle, and a generating step of generating when an image of the input image data stored at the storing step is projected by the projecting unit from the first projection direction through the second projection direction, at least a part of an interval between a position of timing at which the cut-out image data is generated and a driving pulse adjacent thereto and intervals between driving pulses adjacent to each other is nonuniform in a predetermined cycle.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. An image projection apparatus comprising:
 a light modulation device that modulates light according to image data in a pixel unit;
 a projecting unit that projects light modulated by the light modulation device;
 an angle-of-view deriving unit that derives an angle of view at which light modulated by the light modulation device is projected by the projecting unit;
 a projection-direction changing unit that changes a projection direction of the projecting unit from a first projection direction to a second projection direction, based on a minimum variable angle;
 a projection-angle deriving unit that derives a projection angle between the first projection direction and a projection direction changed by the projection-direction changing unit;
 a storage unit that stores input image data input; and
 an image cutting unit that generates cut-out image data that is obtained by cutting a region of a part of an image of the input image data that is stored in the storage unit based on the angle of view and the projection angle in a predetermined cycle as image data projected by the projecting unit when the projecting unit projects from the first projection direction through the second projection direction, wherein
 the minimum variable angle is determined based on the angle of view and a size in a pixel unit of an effective region in which the light modulation device modulates light.

2. The image projection apparatus according to claim 1, wherein the minimum variable angle is larger than 0°, and within the angle of view per pixel of the light modulation device.

3. The image projection apparatus according to claim 2, wherein the angle of view is variable, and the minimum variable angle is determined based on a minimum angle of view.

4. The image projection apparatus according to claim 2, wherein the minimum variable angle is determined based on a maximum size of the effective region.

5. An image projection method comprising:

deriving an angle of view at which a projecting unit that projects light modulated by a light modulation device modulating light according to image data in a pixel unit projects light modulated by the light modulation device;

changing a projection direction of the projecting unit from a first projection direction to a second projection direction based on a minimum variable angle;

deriving a projection angle between the first projection direction and a projection direction changed at the changing;

storing input image data input;

generating cut-out image data that is obtained by cutting a region of a part of an image of the input image data that is stored at the storing based on the angle of view and the projection angle in a predetermined cycle as the image data projected by the projecting unit when the projecting unit projects from the first projection direction through the second projection direction, wherein the minimum variable angle is determined based on the angle of view and a size in a pixel unit of an effective region in which the light modulation device modulates light.

* * * * *